United States Patent
Gangadhar

(10) Patent No.: US 8,650,218 B2
(45) Date of Patent: Feb. 11, 2014

(54) DYNAMIC SELF CONFIGURING OVERLAYS

(75) Inventor: Deepak K. Gangadhar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 12/783,674

(22) Filed: May 20, 2010

(65) Prior Publication Data

US 2011/0289071 A1 Nov. 24, 2011

(51) Int. Cl.
*G06F 17/00* (2006.01)
*G06F 17/30* (2006.01)
*G06F 15/16* (2006.01)

(52) U.S. Cl.
CPC ............... *G06F 17/00* (2013.01); *G06F 17/30* (2013.01); *G06F 15/16* (2013.01)
USPC .......... 707/797; 707/605; 707/606; 707/794; 707/802; 707/803; 707/807; 709/203; 709/206; 706/45; 706/50

(58) Field of Classification Search
USPC ................. 707/600–607, 705, 786, 790–795, 707/796–798, 803–807, 827–829, 953–954, 707/956–958, 802, 203; 709/203–206, 709/218–225; 706/45–50
See application file for complete search history.

(56) References Cited

U.S. PATENT DOCUMENTS

| | | | |
|---|---|---|---|
| 5,471,580 A * | 11/1995 | Fujiwara et al. | 709/249 |
| 6,424,967 B1 * | 7/2002 | Johnson et al. | 1/1 |
| 6,434,557 B1 * | 8/2002 | Egilsson et al. | 1/1 |
| 6,442,560 B1 * | 8/2002 | Berger et al. | 1/1 |
| 6,865,567 B1 * | 3/2005 | Oommen et al. | 1/1 |
| 6,898,603 B1 * | 5/2005 | Petculescu et al. | 707/600 |
| 7,756,896 B1 * | 7/2010 | Feingold | 707/791 |
| 7,873,670 B2 * | 1/2011 | Statchuk | 707/796 |
| 7,900,201 B1 * | 3/2011 | Qureshi et al. | 717/174 |
| 8,032,552 B2 * | 10/2011 | Davies et al. | 707/770 |
| 2005/0060191 A1 * | 3/2005 | Parkins et al. | 705/2 |
| 2005/0060325 A1 * | 3/2005 | Bakalash et al. | 707/100 |
| 2005/0065910 A1 * | 3/2005 | Welton et al. | 707/2 |
| 2005/0079511 A1 * | 4/2005 | Mandema et al. | 435/6 |
| 2005/0192986 A1 * | 9/2005 | Butler | 707/100 |
| 2006/0161354 A1 * | 7/2006 | Mandema et al. | 702/19 |
| 2007/0053252 A1 * | 3/2007 | Gangadhar | 369/36.01 |

(Continued)

FOREIGN PATENT DOCUMENTS

| | | |
|---|---|---|
| CN | 101465796 | 6/2009 |
| CN | 101640623 | 2/2010 |
| WO | WO 2007/147166 | * 12/2007 |
| WO | 2009155374 A2 | 12/2009 |

OTHER PUBLICATIONS

Richard Wong et al. "A parallel sort-balance mutual range-join algorithm on hypercube computers",Microprocessors and Microsystems 22 (1998) 209-215.*

(Continued)

*Primary Examiner* — Srirama Channavajjala
(74) *Attorney, Agent, or Firm* — A. Bruce Clay

(57) ABSTRACT

A node in a computer network is enabled to form a hypercube comprising stored metadata. The node is enabled to exchange the hypercube metadata with neighboring nodes and any hypercube metadata therein. Upon receipt of a query at a node, metadata discovery is initiated using the hypercube metadata, and an overlay is built using results from the metadata discovery.

21 Claims, 22 Drawing Sheets

(56) References Cited

U.S. PATENT DOCUMENTS

| | | | |
|---|---|---|---|
| 2008/0201293 A1* | 8/2008 | Grosset et al. | 707/2 |
| 2008/0281801 A1* | 11/2008 | Larson et al. | 707/4 |
| 2009/0063419 A1 | 3/2009 | Nurminen et al. | |
| 2009/0083861 A1* | 3/2009 | Jones | 726/29 |
| 2009/0287666 A1* | 11/2009 | DeKimpe et al. | 707/4 |
| 2010/0057700 A1* | 3/2010 | Williamson | 707/4 |
| 2010/0169759 A1* | 7/2010 | Le Brazidec et al. | 715/219 |

OTHER PUBLICATIONS

Jenn-Yang Tient et al., "Broadcasting on Incomplete Hypercubes", IEEE 1991, pp. 826-833.*

Darin Jackson, "Distributing Back Propagation Networks Over the Intel iPSC/860 Hypercube", IEEE 1991, pp. 569-574.*

Deepak K Gangadhar, International congress on Ultra Modern telecommunications and control systems and workshops 2010, pp. 875-880.*

Ding et al. "Metadata Harvesting Framework in P2P-Based Digital Libraries", International Conference on Dublin Core and Metadata Applications, Dublin Core Metadata Initiative, pp. 1-9.

Brunkhorst et al. "Distributed Queries and Query Optimization in Schema-Based P2P-Systems", Workshop on Databases, Information Systems and Peer-to-Peer Computing, Springer Berlin/Heidelberg, Sep. 2003, pp. 1-32.

* cited by examiner

| Description | Tree Details | Tree |
|---|---|---|
| 2302 Node 9.1.1.1, to begin with, has a Φ (null) Spanning Tree Existing_ST —2304 | | Φ |
| 2306 Node 9.1.1.1 projects its info_cube for the query dimension S3/*/FR —2308 Cube_ST —2312 | 2322  2324<br>\| 9.1.1.1 \| 9.1.1.2 \| 9.1.1.3 \|<br>\| 250 \| 300 \| 750 \| | (tree 2326: node 1 with edges 50 to 2, 500 to 3) |
| 2316 The spanning tree coming into the node as payload Incoming_ST —2318 | \| 9.1.1.2 \| 9.1.1.3 \| 9.1.1.6 \| 9.1.1.7 \|<br>\| 300 \| 750 \| 200 \| 900 \| | (tree: node 2 with edges 600 to 7, 100 to 6, 450 to 3) |
| 2320 Existing_ST —2304<br>U<br>Cube_ST —2312<br>U<br>Incoming_ST —2318 | \| 9.1.1.1 \| 9.1.1.2 \| 9.1.1.3 \| 9.1.1.6 \| 9.1.1.7 \|<br>\| 250 \| 300 \| 750 \| 200 \| 900 \| | (combined tree 2326) |

FIG. 23

DYNAMIC SELF CONFIGURING OVERLAYS

BACKGROUND

The present invention relates, in general, to improving network functionality, and more specifically to using metadata to construct network overlays.

Computer networks, and more specifically the Internet, have become essential to the conduct of business. As such, networks are driven to provide more bandwidth, more flexibility, and more security, to name a few. Overlay Networks have emerged as a way to achieve more functionality from networks which can be quite unorganized and even chaotic. Overlay Networks are built on top of other networks. Nodes in the overlay can be thought of as being connected by virtual or logical links, each of which corresponds to a path, perhaps through many physical links, in the underlying network. For example, many peer-to-peer networks are overlay networks because they run on top of the Internet, and Dial-up Internet is an overlay upon a telephone network.

Overlays can also be useful in other ways, such as, for example, data searching. When a virtual network is built on top of an existing network, it can be used to manage and administer the network. If all nodes that host sensitive data need to be secured, an overlay network can be formed of all such nodes. For maintenance purposes, if a set of nodes need to be installed with new software, an overlay of such nodes can be created, and an application that distributes software can be configured to distribute the new software to that network of nodes.

BRIEF SUMMARY

According to one embodiment of the present invention, a computer implemented method dynamically builds an overlay of a computer network. At least one node is enabled to form a hypercube comprising metadata stored therein. The at least one node is enabled to exchange the hypercube metadata with neighboring nodes and any hypercube metadata therein. Upon receipt of a query at any node in the computer network, metadata discovery is initiated using the hypercube metadata. The overlay is built using results from the metadata discovery.

According to another embodiment of the present invention, a computer system dynamically builds an overlay of a computer network using a processor. At least one node is enabled to form a hypercube comprising metadata stored therein. The at least one node is enabled to exchange the hypercube metadata with neighboring nodes and any hypercube metadata therein. Upon receipt of a query at any node in the computer network, metadata discovery is initiated using the hypercube metadata. The overlay is built using results from said metadata discovery.

According to another embodiment of the present invention, a computer program product for dynamically building an overlay of a computer network comprises a computer readable storage medium having computer readable program code embodied therewith. Computer readable program code is configured to enable at least one node to form a hypercube comprising metadata stored therein. Computer readable program code is configured to enable the at least one node to exchange the hypercube metadata with neighboring nodes and any hypercube metadata therein. Computer readable program code is configured to, upon receipt of a query at any node in the computer network, initiate metadata discovery using the hypercube metadata. Computer readable program code is configured to build the overlay using results from the metadata discovery.

BRIEF DESCRIPTION OF THE SEVERAL VIEWS OF THE DRAWINGS

FIG. 23 illustrates the various stages of a growing overlay embodied in a spanning tree.

DETAILED DESCRIPTION

Figure 1:
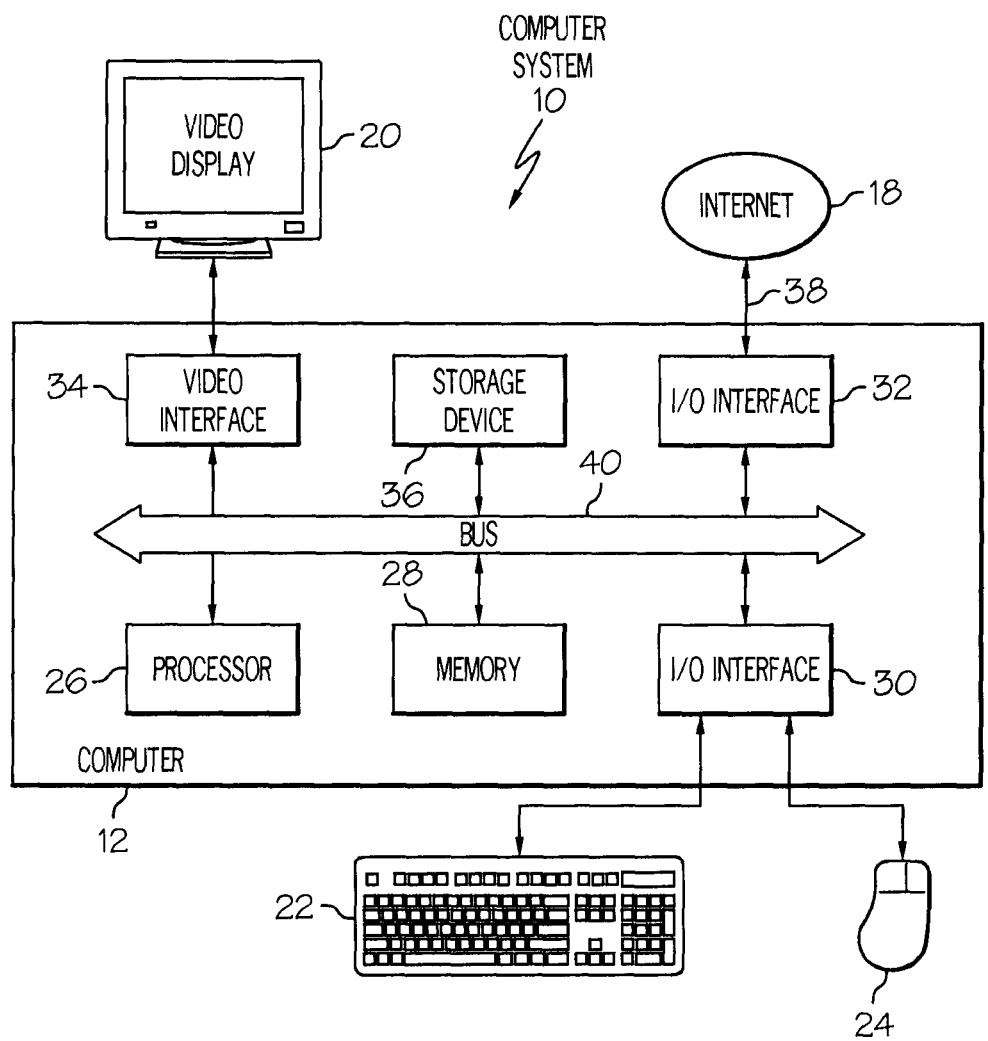
FIG. 1 illustrates a computer system for use with the present invention.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 is one example of a computer system 10 suitable for executing computer software for creating and distributing personalized content in accordance with the techniques described. Other processing devices which are suitable for executing the software can be a wireless telephone, personal assistant device (PDA), portable computer, smart remote control device, or any other processing devices that can execute such software.

The computer system 10 is of a type that executes under a suitable operating system installed on the computer system 10, and may be thought of as comprising software code for efficiently controlling presence awareness through bartering and policy control in a peer-to-peer messaging system. The components of the computer system 10 include a computer 12, a keyboard 22, mouse 24, and a video display 20. The computer 12 includes a processor 26, a memory 28, input/output (I/O) interfaces 30 and 32, a video interface 34, and a storage device 36.

The processor 26 is a central processing unit (CPU) that executes the operating system and the computer software executing under the operating system. The memory 28 includes random access memory (RAM) and read-only memory (ROM), and is used under direction of the processor 26.

The video interface 34 is connected to a video display 20 and provides video signals for display thereon. User input to operate the computer 12 is provided from the keyboard 22 and mouse 24. The storage device 36 can include a disk drive or any other suitable storage medium, as discussed above. Each of the components of the computer 12 is connected to an internal bus 40 that includes data, address, and control buses, to allow components of the computer 12 to communicate with each other via the bus 40. The computer system 10 can be connected to one or more other similar computers via an input/output (I/O) interface 32 using a communication channel 38 to a network, represented as the Internet 18. One or more servers 19 may be connected to the computer 12 via a network, such as, the Internet 18. The servers 19 may comprise the same physical arrangement as the computer 12 and may be co-located with or a part of the computer 12.

The computer software may be recorded on a computer readable storage medium, in which case, the computer software program is accessed by the computer system 10 from the storage device 36. Alternatively, the computer software can be accessed directly from the Internet 18 by the computer 12. In either case, a user can interact with the computer system 10 using the keyboard 22 and mouse 24 to operate the programmed computer software executing on the computer 12.

One embodiment of the present invention will be discussed with reference to the following arrangement of a typical chain of retail stores. This chain has hundreds of stores all over the United States. Each store may have numerous computing nodes such as, for example, Point of Sale (POS) terminals, Storage Area Network (SAN) nodes, and database nodes containing Purchase Orders and Sales Orders. Thus, there may be thousands of nodes within the chain of stores. At any time, there may be various business needs that will require different types of data requests. The following three dynamic (self-initiated) scenarios will be used, herein.

The first scenario is a requirement to determine all shoppers who visited their shops located in certain geographies at a certain time on a certain date. The surveillance videos needed to conduct this search may, and likely do, reside in several nodes distributed across the store network. Thus, it is necessary to identify these nodes and build an overlay network connecting them, as will be subsequently described in greater detail. Once the overlay network is formed, all the needed nodes are functionally linked and can be studied with a video processing application, such as, for example, a facial recognition program.

The second scenario involves a need by the Finance Department to generate a report of all the Purchase Order related documents that were processed over a designated time frame. Thus, all nodes that store Purchase Order documents need to be interconnected. Then, an appropriate application that generates the report can transparently send queries over the overlay to access the needed information.

The third scenario is a request from a Business Intelligence Department to find a way to look at all the sales related to a previous promotion run by a few of their stores over a specific time frame. Therefore, all the nodes that have POS logs related to sales of that promotion need to be interconnected in order to determine whether the promotion should continue.

The retail store network nodes would contain data on:
Surveillance video at stores and airports;
Business transaction documents like Sales Order, Purchase Order, etc;
Products catalog for a store;
Item information; and
Inventory information about items in the warehouse, and so on.

An embodiment of the present invention utilizes metadata, i.e., data that describes other data. In computing nodes hosting multiple types of data, the metadata is information about information present in the nodes. In the first scenario described above, metadata may describe different types of video surveillance data that is stored in the network, such as:
date the video was recorded;
where the video was recorded;
size and format of the video file; and
filters used to analyze the video, such as:
facial recognition; and
movement within certain restricted areas.

Metadata provides assistance to classify, organize, search and locate data much faster than if all the data had to be reviewed. This is especially true when dealing with networks comprising thousands of nodes hosting the needed data. Thus, it may be preferable to work with metadata since trying to work with all the data elements could be too complex.

Figure 2:
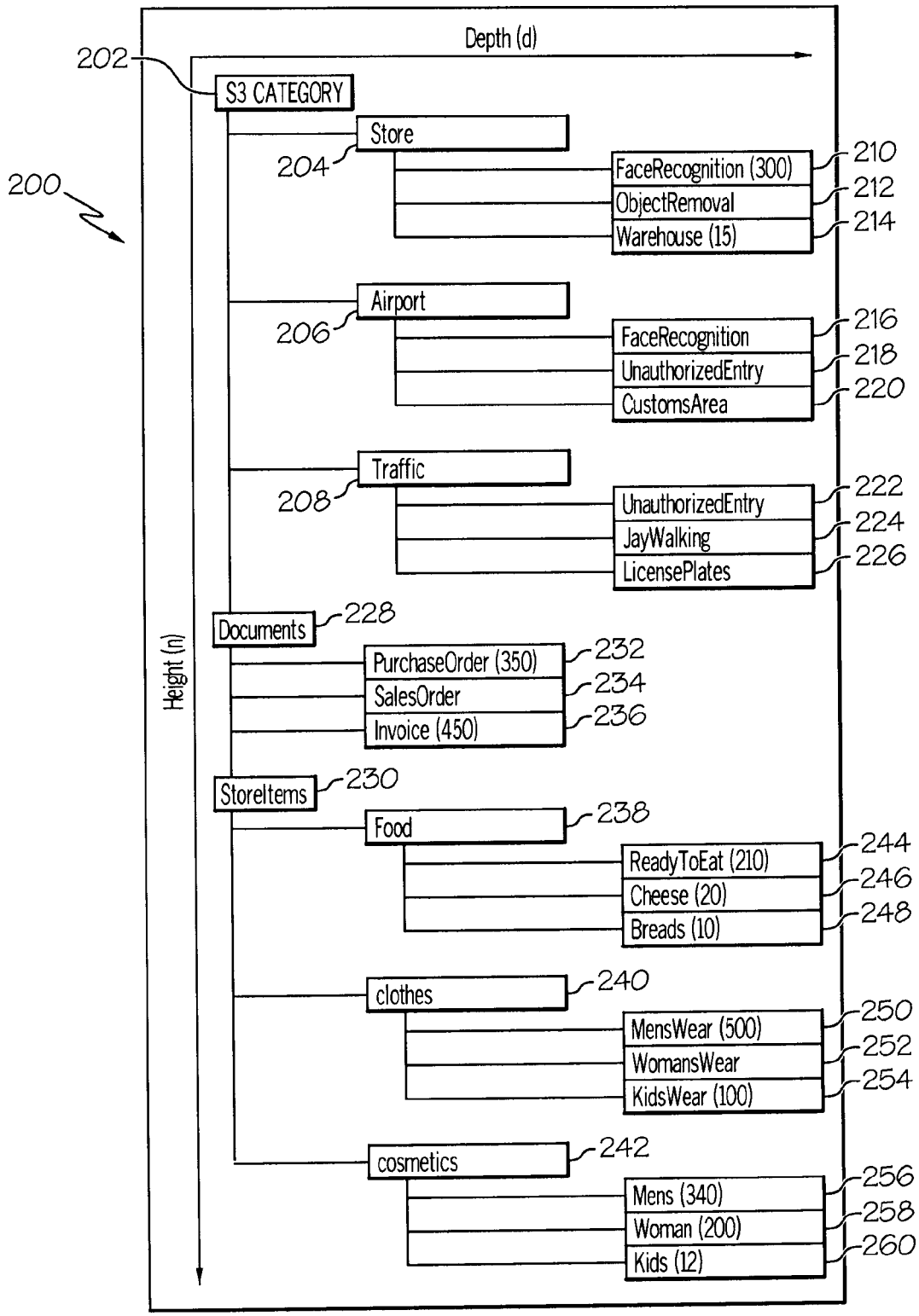
FIG. 2 illustrates a typical node exemplified by a hierarchy.

The data stored in a typical node is exemplified by the hierarchy 200 shown in FIG. 2. At a first level, there are three categories (S3 category (a video surveillance system) 202, Documents 228, and Store Items 230). Under S3 category 202, there are again three categories (store 204, airport 206, and street (Traffic) 208). In addition, each of the videos files could be processed with event sensing filters and be further classified under levels 204, 206, and 208 into the following sub-levels, respectively:
Face/Facial Recognition 210;
Object removal 212;
Warehouse 214;
Face/Facial Recognition 216;
Unauthorized Entry 218;
Customs Area 220;
Unauthorized Entry 222;
Jay Walking 224; and
License Plates 226.

The additional first levels (Documents 228 and Store Items 230), each have their own sets of sub-levels. The hierarchy 200 may also store a quantitative measure of the actual data as part of its metadata entry. The numbers in parentheses represent a simple quantitative measure of the item. For example, Warehouse (15) 214 falls under S3 category 202/Store 204. S3 category 202 is a video surveillance system, therefore, the quantitative measure (15) may indicate 15 minutes of video taken at the warehouse belonging to store 204. In another quantitative example, KidsWear (100) 254 falls under StoreItems 230/Clothes 240. Therefore, the quantitative measure (100) may indicate there are 100 units of clothing for children.

Even with this simplified example, it is apparent that a classification hierarchy will rapidly become too complex to quickly and efficiently query metadata. In an embodiment of the present invention, the metadata is used to convert a data hierarchy, such as hierarchy 200, into hypercubes which are datastructures that can more efficiently hold the metadata.

Figure 3:
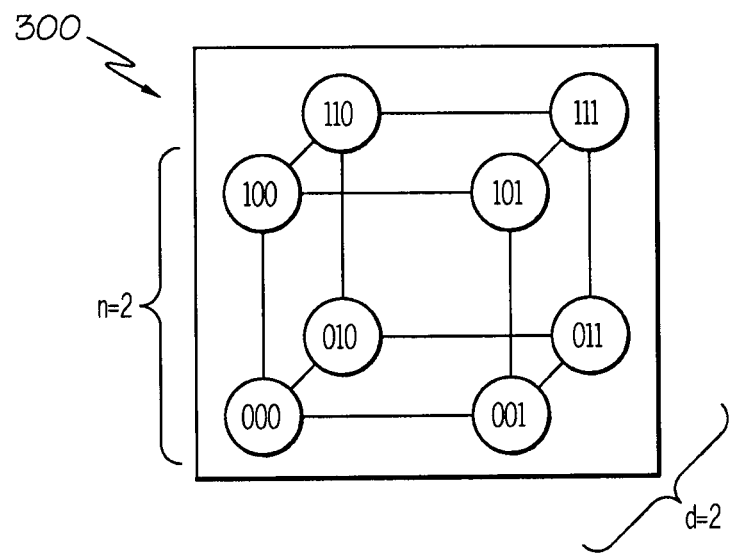
FIG. 3 is a hypercube with three dimensions in accordance with the present invention.

A hypercube is an array of nodes having a maximum height (n) and a maximum depth (d). As shown in FIG. 3, the hypercube 300 is a three dimensional hypercube with a maximum height of two (n=2) and a maximum depth of two (d=2). A hypercube is used as a data-structure to store metadata results from a translation of a data hierarchy, such as shown in FIG. 2, into its corresponding hypercube.

Figure 4:
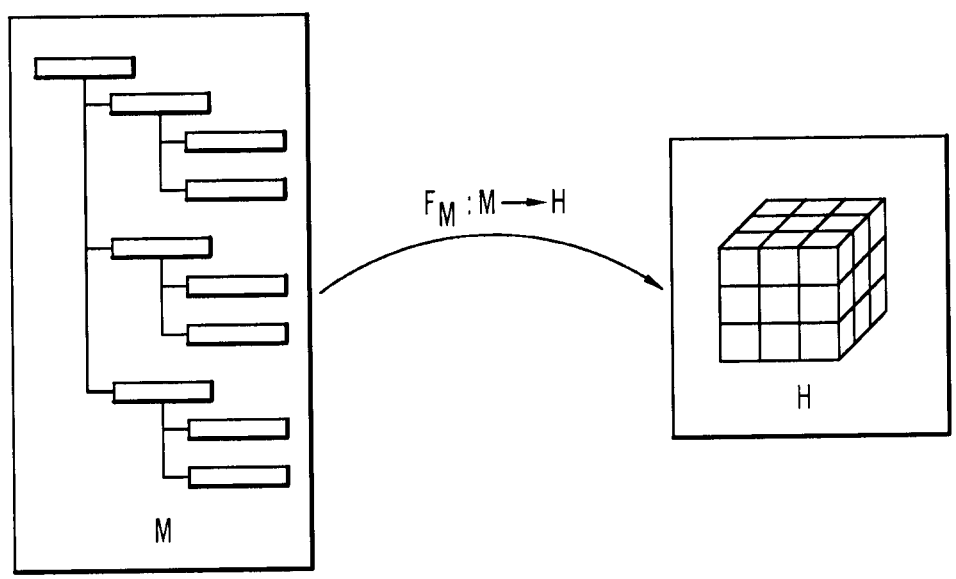
FIG. 4 is a graphical representation of the Metadata Transformation function, which converts the metadata hierarchy into a hypercube.

A metadata Transformation Function $F_M$ uses metadata hierarchy information as input and maps each of its elements into a cell in a hypercube as shown in FIG. 3. This function ($F_M$:M→H) converts the metadata hierarchy (M) present in each of the nodes into a metadata hypercube (H), as graphically illustrated by FIG. 4. Thus, using the metadata hierarchy 200, shown in FIG. 2, the hierarchy 200 has a defined depth and height. The depth (d) of the hierarchy 200 indicates the number of levels that the metadata tree spans. For example, S3 category 202 has a depth of three since the categorization contains paths such as S3/Store/FaceRecognition. The Documents 228 category has a depth of two, since the path stops at Documents/Invoice. Similarly, the height (n) indicates the number of categories present per root category. For instance, the complete hierarchy 200 has a height of three (n=3) at the first level, the S3 category 202 has a height of three at its first level, and so on.

Given the metadata hierarchy M(n,d) where n=max (height) and d=max (depth), $F_M$ maps the elements of M to a hypercube H(n,d), which is a hypercube in d dimensions. Since d may be any number, one may not be able to 'visualize' the hypercube's dimensions. For example, a person may be represented by four parameters: age, salary, number of children, and number of cars. This person can be defined in a four dimensional space even though one cannot visualize a four dimensional space.

The hypercube has orthogonal axes to represent each level of the metadata. Therefore, to determine the dimensions of the hypercube, the maximum height and depth of a hierarchy must be determined. Since there is a separate axis to represent each level of data, the cube must be capable of storing the maximum depth of elements present in any level. In the first level of FIG. 2, there are 3 categories: S3 category 202, Documents 228, and Store Items 230. Under S3, there are 3 categories: Store 204, Airport 206, and Traffic 208. Thus, the maximum height of the hierarchy is three.

Similarly, looking at the maximum depth of the hierarchy 200, S3 category 202 has 3 levels, Documents 228 has 2 levels, and StoreItems 230 has 3 levels. Thus, the maximum depth is 3. For the example shown in FIG. 2, the hypercube will be H(3,3). Each of the metadata elements like S3 category 202, Airport 206, Store 204, FaceRecognition 210, etc. form dimensions of a hypercube.

As previously stated, the function FM maps/translates the metadata tree M(n,d) to a hypercube H(n,d):
FM: M→H, where FM is the Metadata transformation function, M is the Metadata
Hierarchy, and H is the Hypercube. Specifically:
FM:

$$\forall m \in M(n,d), h \in H(n,d) \exists i1, i2, il (l<n)$$

such that h(i1,i2,il), which is a cell in the hypercube corresponding to the index i1, i2 ... il, (l<n), gets mapped to the corresponding entry in the metadata hierarchy.

Further, the Metadata transformation function defines $F_M$ such that for every value present in M (M being the metadata hierarchy) AND for every value that belongs in H (H being the hypercube), there exists indices values $i_1, i_2 \ldots i_l$. These values are the index of the hypercube which is used to identify the corresponding metadata entry. For example, S3/Store/FaceRecognition is mapped to H(0,0,0) here $i_1$ is 0, $i_2$ is 0 and $i_3$ is 0, while 'l' (lower case L) is used to indicate that the indices will be less than n (where n is a maximum (height) of the hierarchy tree). Additionally, the symbols used above are defined as:

: equals "such that"
$\forall$ equals "For every"
$\in$ equals "belongs to"
m∈M(n,d) equals "all values of m that exist in the Metadata hierarchy"
h∈H(n,d) equals "all values of h that exist in the Hypercube"
$\exists i_1, i_2, i_l$ equals "there exists values $i_1, i_2 \ldots i_l$"
(l<n) equals "where l is less than n."

$F_M$ maps the entries of the metadata hierarchy 200 (FIG. 2) into the corresponding cells of a hypercube H(n,d). For example, referring to FIG. 5, the S3 category 202/Store 204/FaceRecognition 210 is mapped to H(0,0,0), as represented by reference numeral 501. S3 category 202/Store 204/ObjectRemoval 212 is mapped to H(0,0,1), as represented by reference numeral 503, and so on. $F_M$ attempts to construct the mapping such that each cell in the hypercube has the least possible hamming distance (measure of how many index values have to be changed to move from one cell to the other). The function is built so that closely related cells occur near each other (minimal hamming distance). For example, S3/Store/FaceRecognition is mapped to H(0,0,0), S3/Store/ObjectRemoval is mapped to H(0,0,1) and so on. Mapping could be to a random index, but this may slow fetching information.

Figure 5:
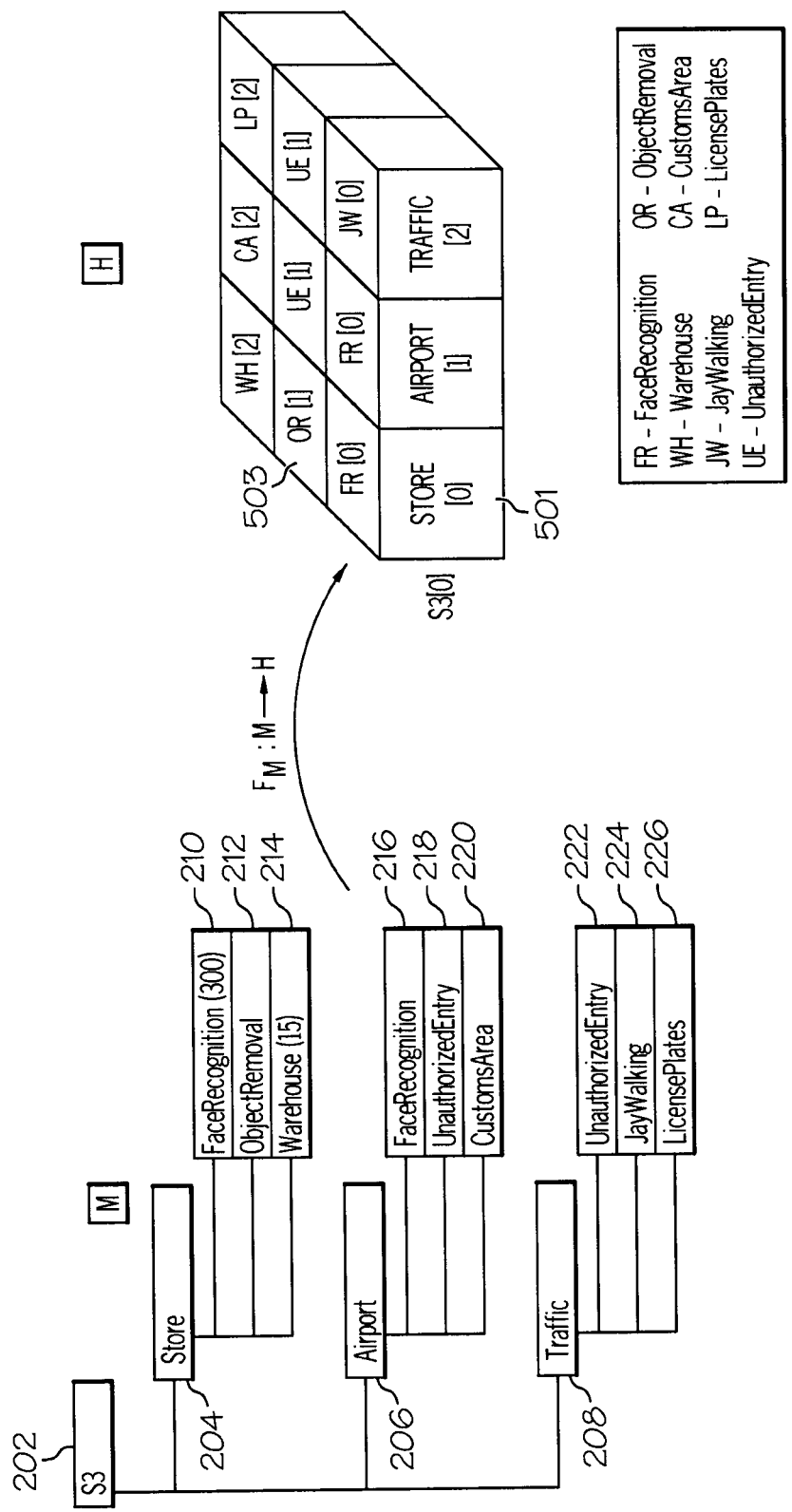
FIG. 5 illustrates mapping of a hierarchy to a cube.

Since the metadata is mapped to orthogonal axes, having the least possible hamming distance ensures that projection of the hypercube against the given query dimension yields the most relevant results. FIG. 5 shows the mapping of the S3 category 202 in more detail. Listed below are more examples of mappings from the metadata hierarchy to the hypercube with the corresponding metadata value in braces:

S3 202/Airport 206/CustomsArea 220→H(0,1,2) [0]
Documents 228/PurchaseOrder 232→H(1,0,0) [350]
Documents 228/Invoice 236→H(1,1,0) [450]
StoreItems 230/Food 238/Cheese 246→H(2,0,1) [20]

The metadata hypercube, also interchangeably referred to herein as an Info-Cube, is the primary information exchange element between overlay nodes. The Info-Cubes are exchanged when one node connects to another node as a peer. Each Info-Cube supports the following operations that the nodes utilize during the metadata discovery stage:

| Unary operations: | Binary operations: |
|---|---|
| Cumulation Projection | Union |

Cumulation:
This operation results in the Info-Cube accumulating its downstream information and propagating it upstream. Usually, only the leaf nodes contain the quantitative information of the data present. For instance, S3 category 202/Store 204/FaceRecognition 210 might have a value of three hundred. A query to find all information related to digital videos of the store, in the form of: S3/*, the FaceRecognition 210 information might get lost and its node might not participate in the overlay. Thus, this value of three hundred should also appear in the S3 category 202/Store 204 level, along with any other videos from the store. The cumulation operation ensures this.

Figure 6:
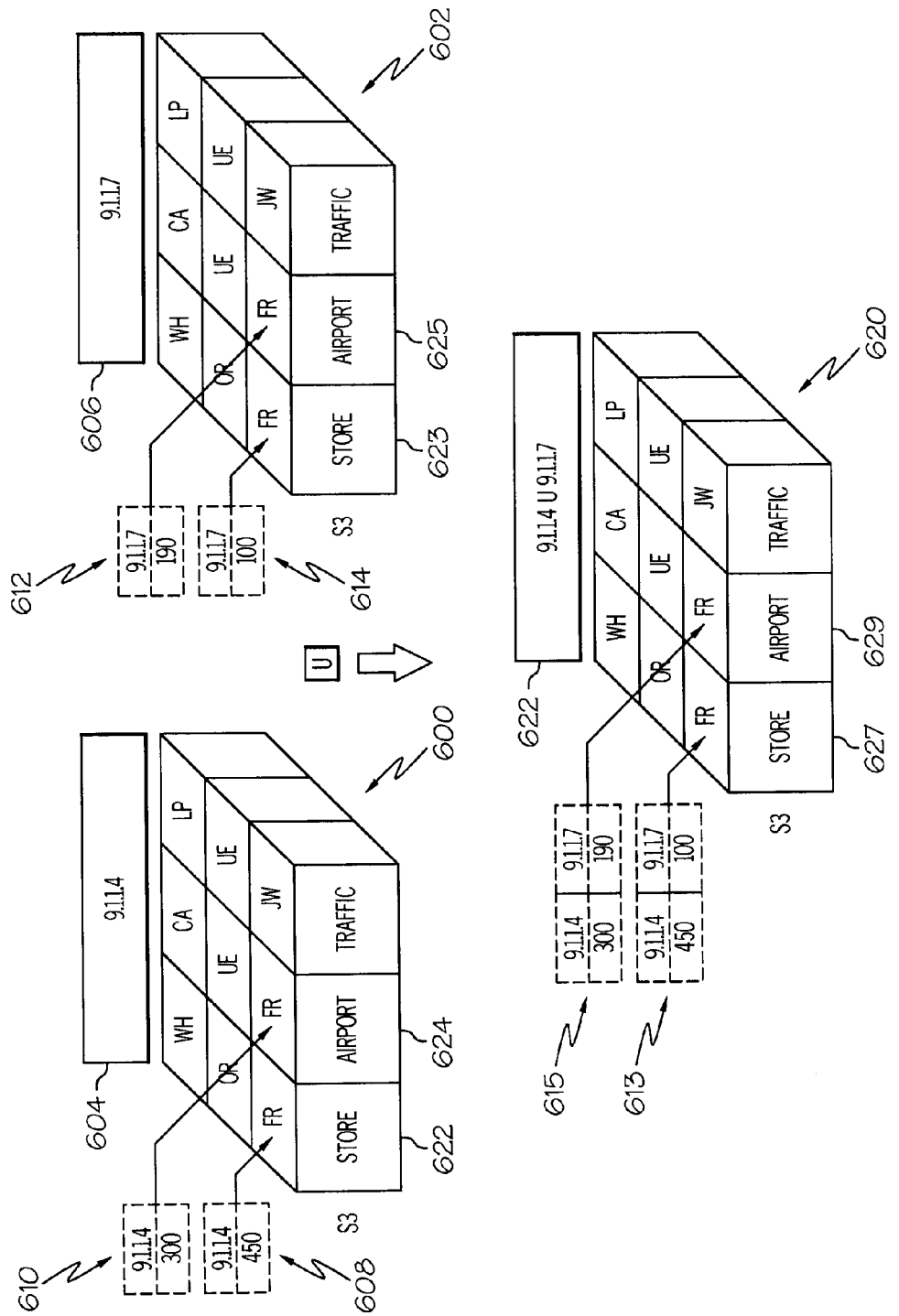
FIG. 6 illustrates a union operation in accordance with the present invention.

Union:

The union operation is used when there is need to consolidate the metadata information present in two or more nodes. When a node joins a neighborhood, Info-Cubes are exchanged which result in each node having information about its neighbor's metadata. In such scenarios, union operations are performed as illustrated in FIG. 6. An Info-Cube stores data within each cell as a list of pairs [key, value]. The key is the IP Address of the node (a computer or any other appropriate device), and the value is a quantitative measure of the data, as previously defined. For example, a first Info-Cube 600 is on a first node 604 having an IP address of 9.1.1.4. There are numerous cells in the Info-Cube 600, but for the sake of clarity, only two will be discussed. The two cells 622 and 624 within the Info-Cube 600 contain FaceRecognition metadata of 450 and 300, respectively. Therefore, the data within the cells 622 and 624 will be stored as (9.1.1.4, 450) and (9.1.1.4, 300), as represented by reference numerals 608 and 610, respectively.

A second Info-cube 602 is on a second node 606 having an IP address of 9.1.1.7. Two cells 623 and 625 (corresponding to the cells 622 and 624 of Info-Cube 600) within the Info-Cube 602 contain FaceRecognition metadata of 100 and 190, respectively. Therefore, the data within the cells 623 and 625 will be stored as (9.1.1.7, 100) and (9.1.1.7, 190), as represented by reference numerals 614 and 612, respectively.

When a union operation of the Info-Cubes 600 and 602 is performed, a merged Info-Cube 620 is formed. Two cells 627 and 629 (corresponding to the cells 622 and 624 of Info-Cube 600 and the cells 623 and 625 of Info-Cube 602) within the Info-Cube 620 contain the FaceRecognition metadata of both Info-Cubes 600 and 602. Therefore, the data within the cells 627 and 629 will be stored as [(9.1.1.4, 450) and (9.1.1.7, 100)] and [(9.1.1.4, 300) and (9.1.1.7, 190)], as represented by reference numerals 613 and 615, respectively.

Projection:

Nodes typically send out a search request as a query dimension. This query dimension is used to reduce the Info-Cube along the desired axes and extract the IP addresses of the nodes possessing the data pointed to by the query dimension. For example, a particular application might request for data related to S3 videos at all locations having Face Recognition events. The query dimension constructed for this request would look like S3/*/FaceRecognition. Or, if there is a specific need for monitoring airports, the query would look like S3/Airport/FaceRecognition. Using this query dimension, the projection operation is performed on the Info-Cube.

When an overlay needs to be built (to expedite searching, to manage and administer, secure sensitive data, and etc.), a node gets a request for a particular type of search. For instance, if there is a query for all videos for FaceRecognition, a typical query might be S3/*/FaceRecognition. The end result for such a request must be the IP Addresses of all nodes stored as keys in the Info-Cube cells. Projections on the cube are executed against an incoming query. To obtain the results for such queries, the Info-Cube is subjected to a series of dimension reducing projections that successively whittle down the dimension of the Info-Cube, until only the required dimension is obtained, and the required data is extracted.

Figure 7:
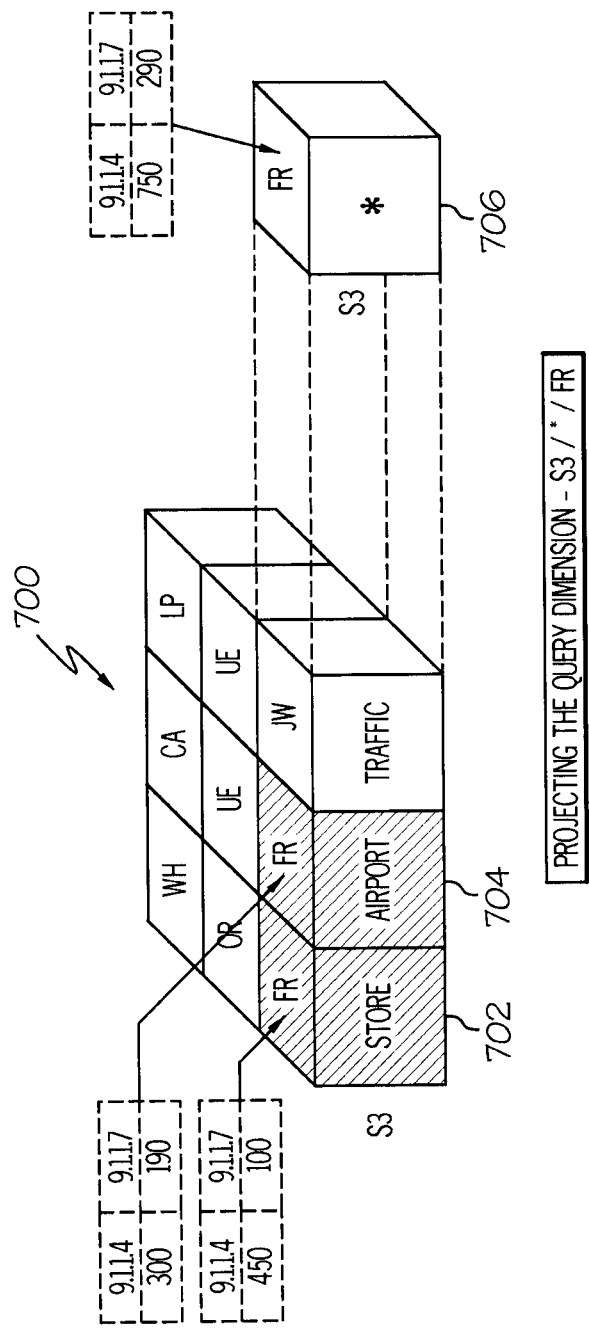
FIG. 7 illustrates the projections of an Info-Cube for S3/*/FaceRecognition.
Figure 8:
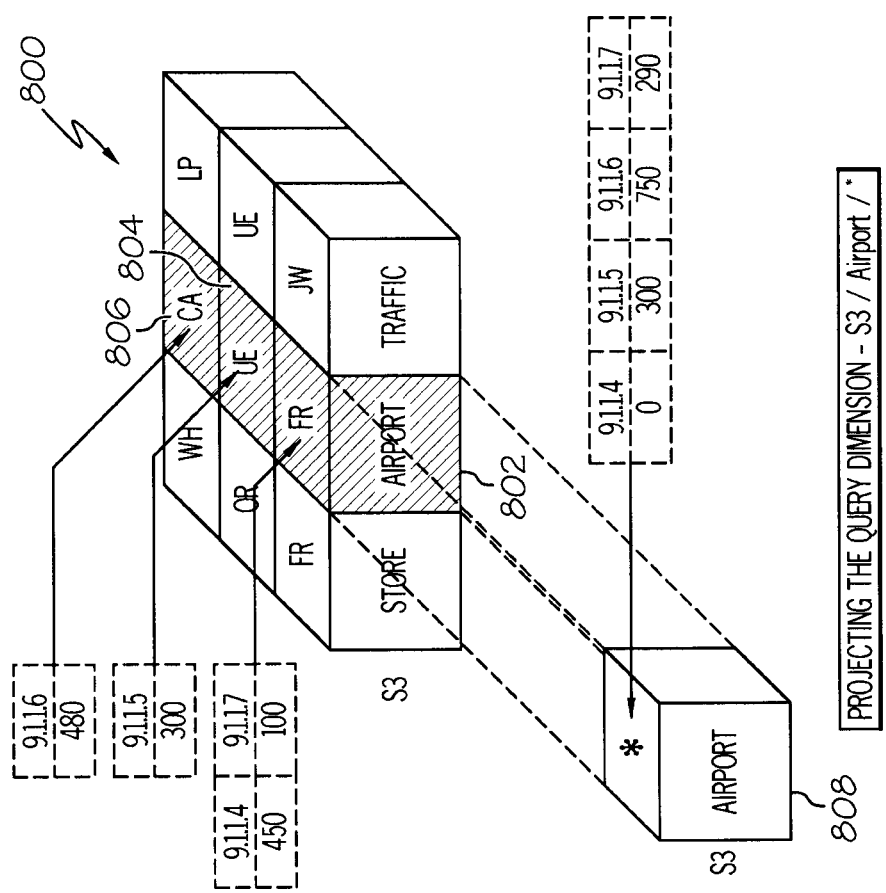
FIG. 8 illustrates the projections of an Info-Cube for S3/Airport/*.

FIG. 7 shows the projections of an Info-Cube for S3/*/FaceRecognition, while FIG. 8 shows the projections of an Info-Cube for S3/Airport/*. Referring first to FIG. 7, a query for all videos for FaceRecognition is generated as S3/*/FaceRecognition. The Info-Cube 700 contains numerous cells, but only the cells 702 and 704 contain FaceRecognition metadata. Therefore, the projection containing the requested data is shown as dimension 706.

Similarly, FIG. 8 reflects a query for all videos from the airport generated as S3/Airport/*. The Info-Cube 800 contains numerous cells, but only the cells 802, 804 and 806 contain airport video metadata. Therefore, the projection containing the requested data is shown as dimension 808.

It is during projection operations that hamming distance plays an important role. In FIG. 7, for example, it can be seen that all the FR (FaceRecognition) cells occur alongside each other along the S3/* axis. When the Info-Cube is constructed, the Metadata Transformation Function $F_M$ ensures that all similar elements are stacked alongside each other so that projections yield results faster and the query time is reduced. Searching the Info-Cube for similar information like S3/*/FR will now project all such cells having FR information together, rather than search for them all over the Info-Cube.

In an embodiment of the invention, Info-Cubes are used to represent the metadata present in the nodes of a network. The Info-Cubes will be used to query for different types of metadata. Representing the data as Info-Cubes provides a rich set of actions that can be performed upon them, such as, Union, Cumulation, and Projection, which would otherwise not have been possible. Returning to the metadata hierarchy 200 of FIG. 2, a number of data storage nodes are distributed across various locations, all of which store video surveillance data (S3 category 202). For example, the video files must be analyzed for particular events that have taken place.

A video event filter screens the video files and tags them with various events detected, for example, whether there are faces of people, or videos of violations in restricted areas, etc. In this example, a network is to be formed of all nodes that store this video surveillance data, in general, and for videos marked as FaceRecognition videos, in particular. Further, a surveillance application that has this video data is on a physical network. Thus, a virtual network is to be built on top of the physical network. This virtual network will comprise all nodes that have video surveillance data. In other words, an Overlay Network of all S3 (video) data is needed. This overlay need not be permanent since after this particular need, the overlay would probably not be reused. Therefore, the overlay needs to be dynamic.

Figure 9:
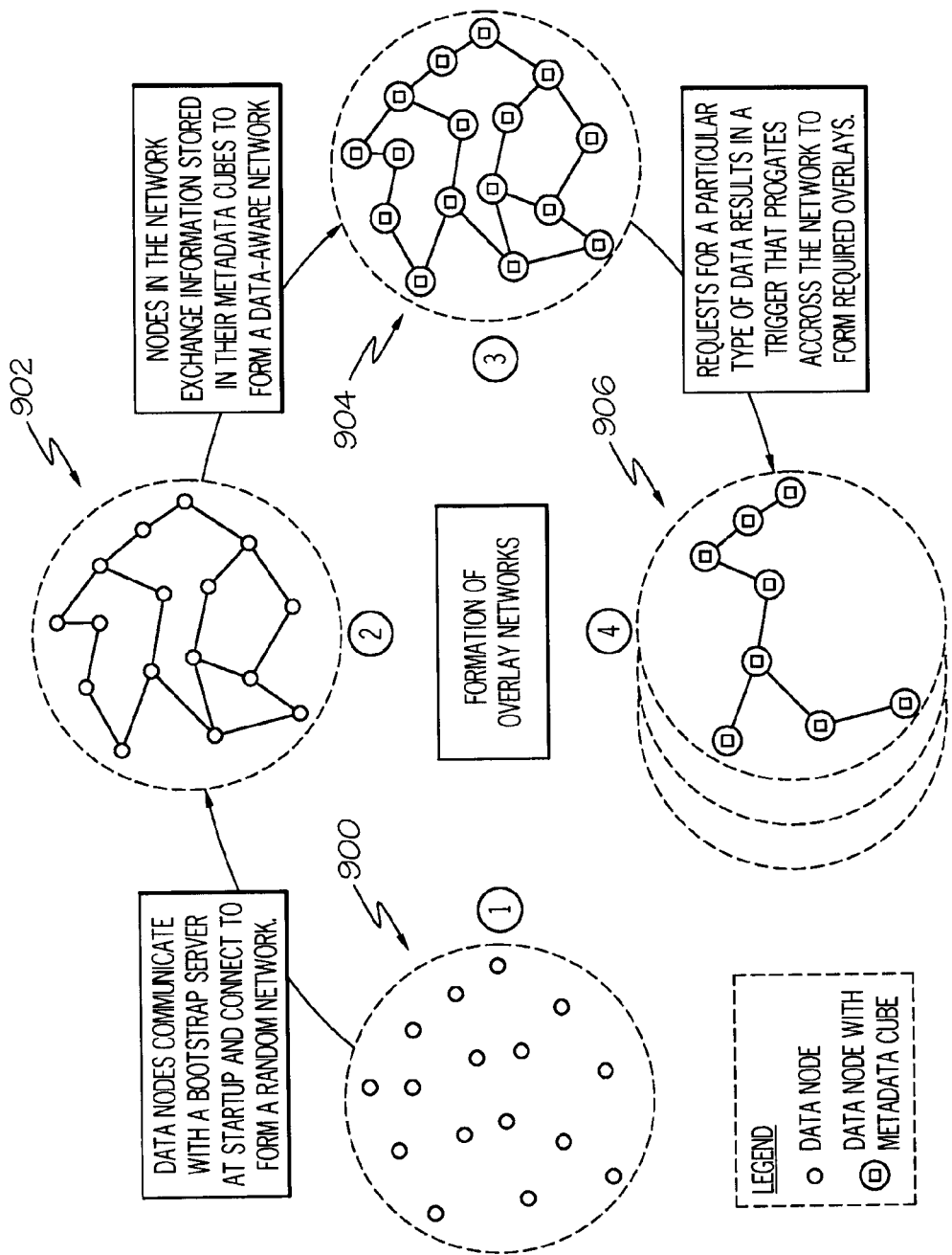
FIG. 9 shows a high level overview of the various stages involved in forming an overlay network.

When any node is queried for a particular type of data, the node checks whether an overlay for this particular type of query is already formed. If not, the node forms an overlay comprising all nodes with that relevant data. FIG. 9 shows a high level overview of the various stages involved in forming an overlay network.

Referring to FIG. 9, the following assumptions are made:

Given:
  A random network of nodes containing multiple data elements with its metadata captured as an Info-Cube; and
  A request for a particular category of data is made.

Required:
  Identify the sub-set of nodes that possess the given data in the query; and
  form an overlay network over the existing network, such that the overlay contains all nodes that possess the elements of a particular classification type (dictated by a classification hierarchy) mentioned in the query.

Stage 1: Initial network (stages are identified with circled numerals in the Figures).

During an initial stage, the nodes (or more specifically, data-nodes for content based overlays) are deemed disconnected and not yet part of any network, as generally indicated by reference numeral 900. Each of these data-nodes contains data elements whose metadata is captured in a classification hierarchy, like the one previously shown in FIG. 2. The nodes also have a quantitative measure of the actual data present in them. This information will be used in the subsequent network stages as the network evolves from a disconnected state to an overlay aware state.

Stage 2: Bootstrapping for random network information.

As nodes get powered on, the disconnected nodes begin connecting with each other to form an unplanned random network, as generally represented by reference numeral 902. Some rudimentary rules, like network proximity may form the basis for the random network formation, but this is not required. The nascent nodes connect to a bootstrap server to get information about which nodes to connect with. Once the nodes join the network, they become completely autonomous and communicate with their peers without the intervention of a centralized controller, like the bootstrap server.

Stage 3: Metadata aware network using Info-Cube propagation.

In stage 3, the unplanned network continues to remain in essentially the same state, as generally represented by reference numeral 904. However, the nodes are now aware of their neighbor's contents with relation to metadata. Each node forms its Info-Cube and also exchanges the same with their immediate neighbors. A configurable parameter called Time-To-Live (TTL) is used as a parameter that determines how long the message survives in the network. If the message has a TTL of 3, then after it passes through 3 nodes, it expires. Thus, the TTL determines the depth to which this information propagates through the network. There is a trade-off between the time spent disseminating this metadata information versus the time it takes to form the final overlay. The more time spent in this stage, the less time it takes to build the final overlay.

Stage 4: Overlay formation using spanning trees.

When an external or internal node makes a request for a particular type of data, the overlay formation is triggered within the network. The nodes of the random/unplanned network now perform a metadata discovery process using the information stored in the Info-Cubes, and use the resulting data to form the requested overlay network, as generally identified by the reference numeral 906. The overlay network is in the form of a Spanning Tree (a sub-set of the network). The Info-Cubes are projected against an incoming query dimension to obtain nodes that should form part of the overlay.

Figure 10:
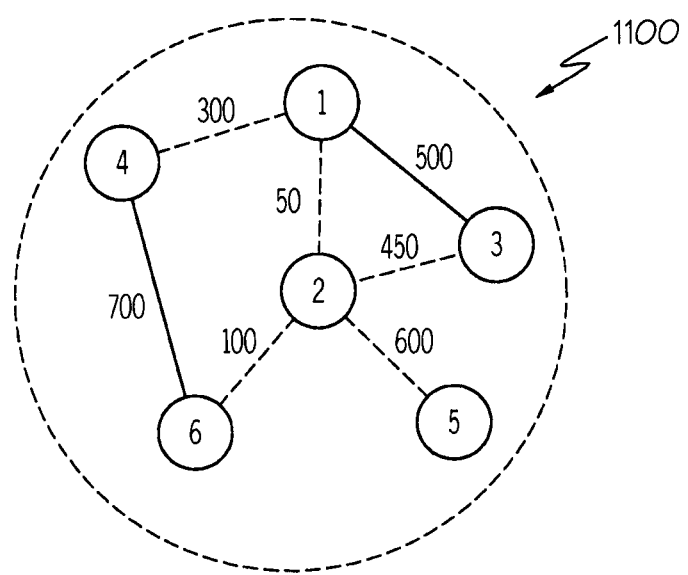
FIG. 10 illustrates a spanning tree.

Referring to FIG. 10, a minimal spanning tree of the graph 1100 is shown in dashed lines. There are 2 circuits (closed paths) in the graph 1100, comprising vertices (1, 2, 3) and (1, 2, 6, 4). In the first circuit (1, 2, 3), edge (1, 3) is removed since it has the highest weight (500) in that circuit, and in the second circuit (1, 2, 6, 4), edge (4, 6) is removed because it has the highest weight (700). In an embodiment of the present invention, the edge weights translate to the quantitative measures of similar content hosted in the corresponding nodes, such as, for example, the number of KidsWear (100), as identified by reference numeral 254 shown in FIG. 2. By removing the edge with the highest weight, nodes with comparable quantities are connected together.

In an embodiment of the present invention, a metadata hypercube (Info-Cube) is used to build a minimal spanning tree that adds semantics to an overlay in terms of metadata present in the network. Furthermore, projecting the Info-Cube against the incoming query dimension yields an accurate set of nodes that need to be part of the overlay. A spanning tree that finally represents an entire overlay can be created by successively using projection. Also, the Info-Cube supports wild-card queries like S3/*/FaceRecognition when building overlays for complex real-life data search applications.

Figure 11:
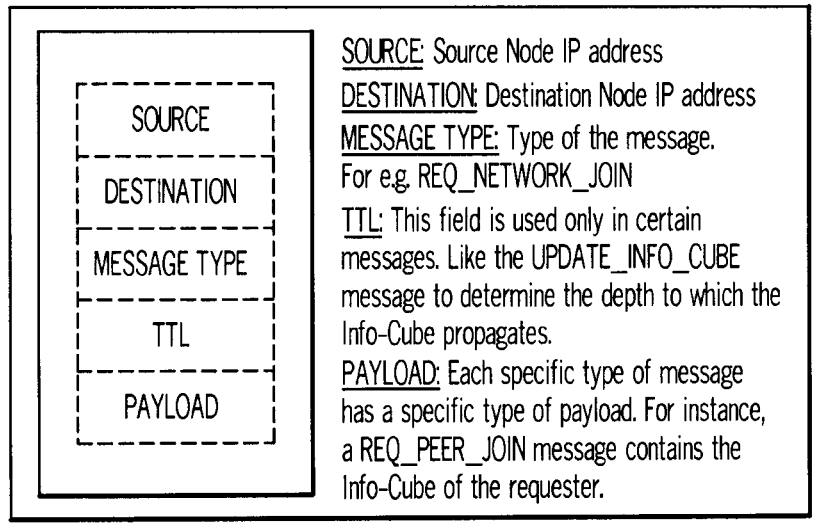
FIG. 11 illustrates the composition of a payload.

The nodes of the network communicate using standard TCP-IP message packets. Since the overlay construction algorithm needs different types of messages, there are types of payloads associated with each specific message. In accordance with an embodiment of the present invention, a payload is composed as shown in FIG. 11, which goes as a payload within a standard TCP-IP message. Table-1 (below) shows a complete list of messages used with a description of the message and the payload.

TABLE 1

Message types used by an embodiment of the present invention.

| MessageType | Description | Payload |
| --- | --- | --- |
| Messages used during the network transitioning from stage 1 to stage 2. | | |
| REQ_NETWORK_JOIN | Message sent by a candidate node to the bootstrap node requesting for a set of IP Addresses of nodes in the existing network | Relevant data to calculate the proximity measure of this node with respect to the network. |
| ACK_NETWORK_JOIN | Acknowledgement message sent by the bootstrap node to any candidate node that is requesting to join the network. | IP addresses of potential peer nodes |
| REQ_PEER_JOIN | Message sent by a candidate node to a node already present in the network requesting permission to join as a peer to the node. | Info-cube of the candidate node |
| ACK_PEER_JOIN | Acknowledgement message sent by the node present in the network to the candidate node allowing it to join as peer. | Info-cube of the peer node. |
| CONF_NETWORK_JOIN | Confirmation message sent by the candidate node to the bootstrap node after it successfully joins the network | |

TABLE 1-continued

Message types used by an embodiment of the present invention.

| MessageType | Description | Payload |
| --- | --- | --- |
| Messages used during the network transitioning from stage 2 to stage 3. | | |
| UPDATE_INFO_CUBE | Message sent between nodes forming the unplanned network to exchange their info-cubes. | Consolidated info-cubes |
| Messages used during the network transitioning from stage 3 to stage 4. | | |
| UPDATE_SPAN_TREE | Message sent between nodes forming the overlay network for a specific query dimension. | Overlay network represented by a spanning tree |
| Other Messages | | |
| REQ_DATA | Message sent to any node in the network from the external world. This message triggers the Overlay formation | Query dimension like S3/*/FaceRecognition |

The network layer is abstracted into a 'black box' that transfers messages between the nodes designed to use the services of the network. These nodes reside on top of the network abstraction, and each node has a message queue attached to it. The nodes read the messages off this queue and the network writes into this queue. Any node sending a message to another node composes the message with the relevant payload and hands it over to the network. The network will then write this message into the message queue of the destination node, which will subsequently be read by the destination node from its queue.

Figure 12:
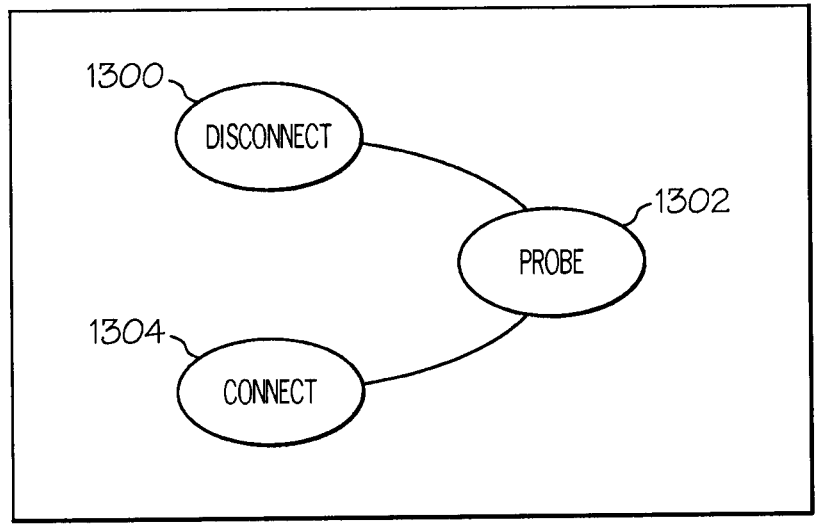
FIG. 12 illustrates bootstrapping for formation of a random network.

Stage 2, as described above, (bootstrapping for random network formation) is further shown with reference to FIG. 12. When a node starts but has not yet joined a network, the node is in the Disconnect state 1300. Once the node has performed its initial startup activities, it moves to the Probe state 1302. A node in the Probe state goes through the procedure, explained as follows, until it becomes a part of the network. Once the node joins the network, it moves to the Connect state 1304.

Figure 13:
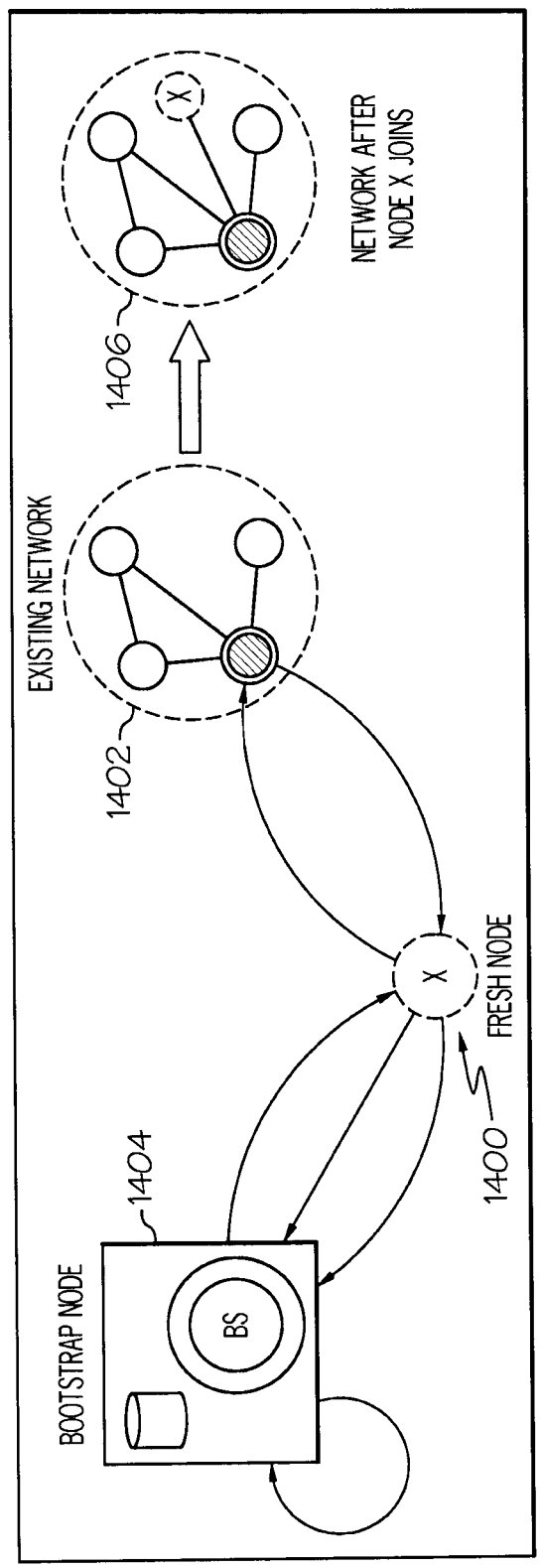
FIGS. 13 and 14 further illustrate a bootstrapping operation.
Figure 14:
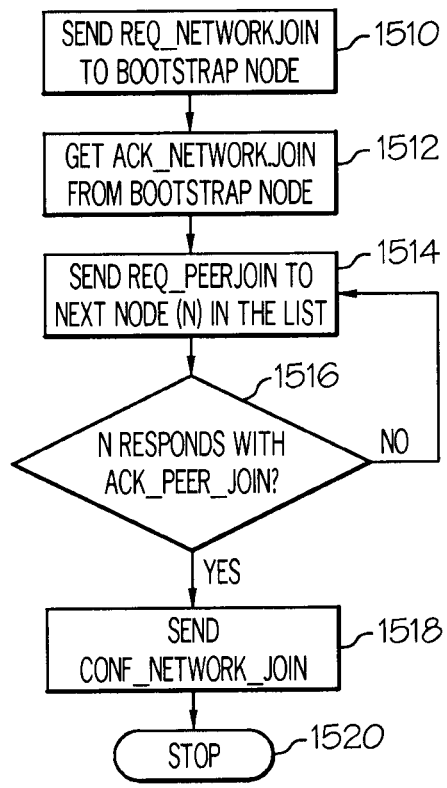

To further describe the bootstrap operation, refer to FIGS. 13, and 14. In FIG. 13, node X, generally identified by reference numeral 1400, needs to join the existing network 1402. At startup, all nodes are configured to contact a set of bootstrap nodes, such as, for example, bootstrap node 1404. Bootstrap nodes maintain a list of nodes that are already part of the network. Based on a defined proximity measure, the bootstrap returns a list of candidate nodes for the new node.

In FIG. 14, node X 1400 sends a REQ_NETWORK_JOIN message at block 1510 to the bootstrap node 1404. The bootstrap node address is already present in Node X 1400 at startup. The bootstrap node 1404 then looks through its repository of nodes that are already part of the network. Based on a configurable proximity measure, such as, nodes in the same subnet, the bootstrap node 1404 then calculates the best possible nodes in the existing network to which Node X 1400 can connect. At block 1512, the bootstrap node 1404 returns an ACK_NETWORK_JOIN to Node X 1400 containing a list of IP addresses of the nodes in the existing network 1402.

At block 1514, Node X 1400 then 'walks' through the list and sends a REQ_PEER_JOIN to the nodes in the list of IP addresses until one of them responds. As part of the payload, Node X 1400 sends its own Info-Cube, so that if the other node accepts its request, then X's Info-Cube can be incorporated into the network.

At decision block 1516, it is determined whether at least one of the potential candidate nodes responds with an ACK_PEER_JOIN message. If the response to decision block 1516 is no, the process returns to block 1514 and sends another REQ_PEER_JOIN to the next node in the list. If the response to decision block 1516 is yes, the process flows to block 1518 where Node X 1400 joins the network as a peer to the node that responded to its request, and sends out a CONF_NETWORK_JOIN (a confirmation message) to the bootstrap node 1404, indicating that it successfully joined the network.

The bootstrap node 1404 updates its database with the latest information about Node X 1400 joining the network along with information, which will be used when the bootstrap node 1404 needs to respond to other nodes that are interested in joining the network. The process then ends at 1520. A symbolic representation of the network after Node X 1400 joins is indicated by reference numeral 1406 in FIG. 13.

Figure 15:
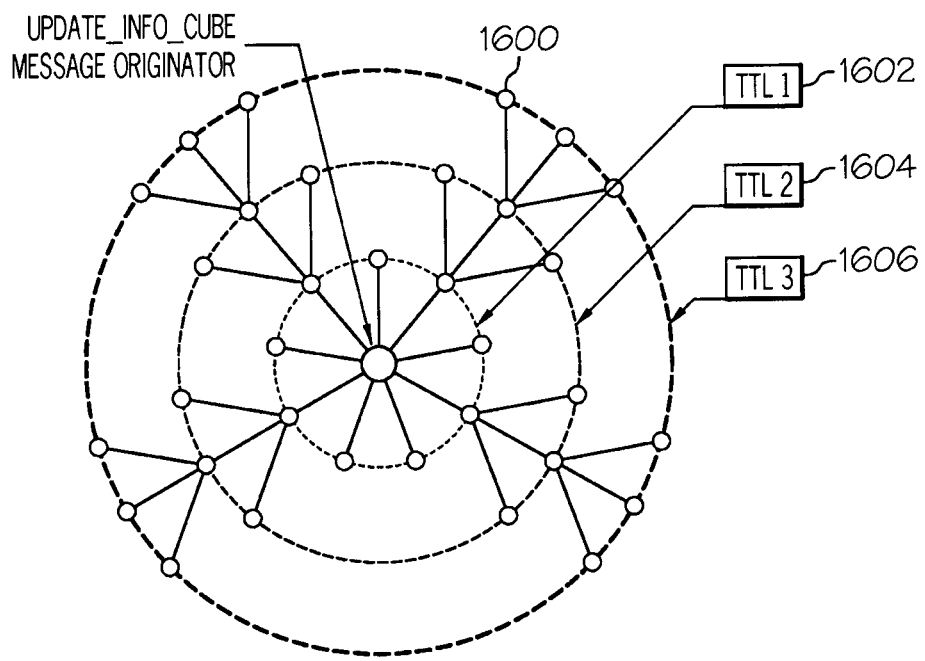
FIG. 15 illustrates Info-Cube propagation.

Info-Cube propagation is symbolically shown in FIG. 15. Each node (represented by small circles, such as, node 1600), starts off with its own metadata information captured in an Info-Cube. When nodes connect with each other to form neighbors, each node updates its Info-Cube using the Union operation, as previously described above. When an Info-Cube changes, each node sends out a UPDATE_INFO_CUBE message to each of its neighbors. These neighbors in turn send it to their neighbors and so on, until the Time_To_Live (TTL) parameter in the original message expires. As previously described above, the TTL is a critical parameter that determines the depth of Info-Cube propagation across the network. The longer the UPDATE_INFO_CUBE message survives in the network, the greater will be the penetration of this information to all the nodes in the network, leading to a much greater awareness of the metadata available in the network. FIG. 15 shows the UPDATE_INFO_CUBE messages propagating across a network of nodes indicated as TTL1 1602, TTL2 1604, and TTL3 1606 (thus, indicating the TTL was set at 3). The impact of having a larger TTL during the final overlay formation will be subsequently discussed in greater detail.

Figure 16:
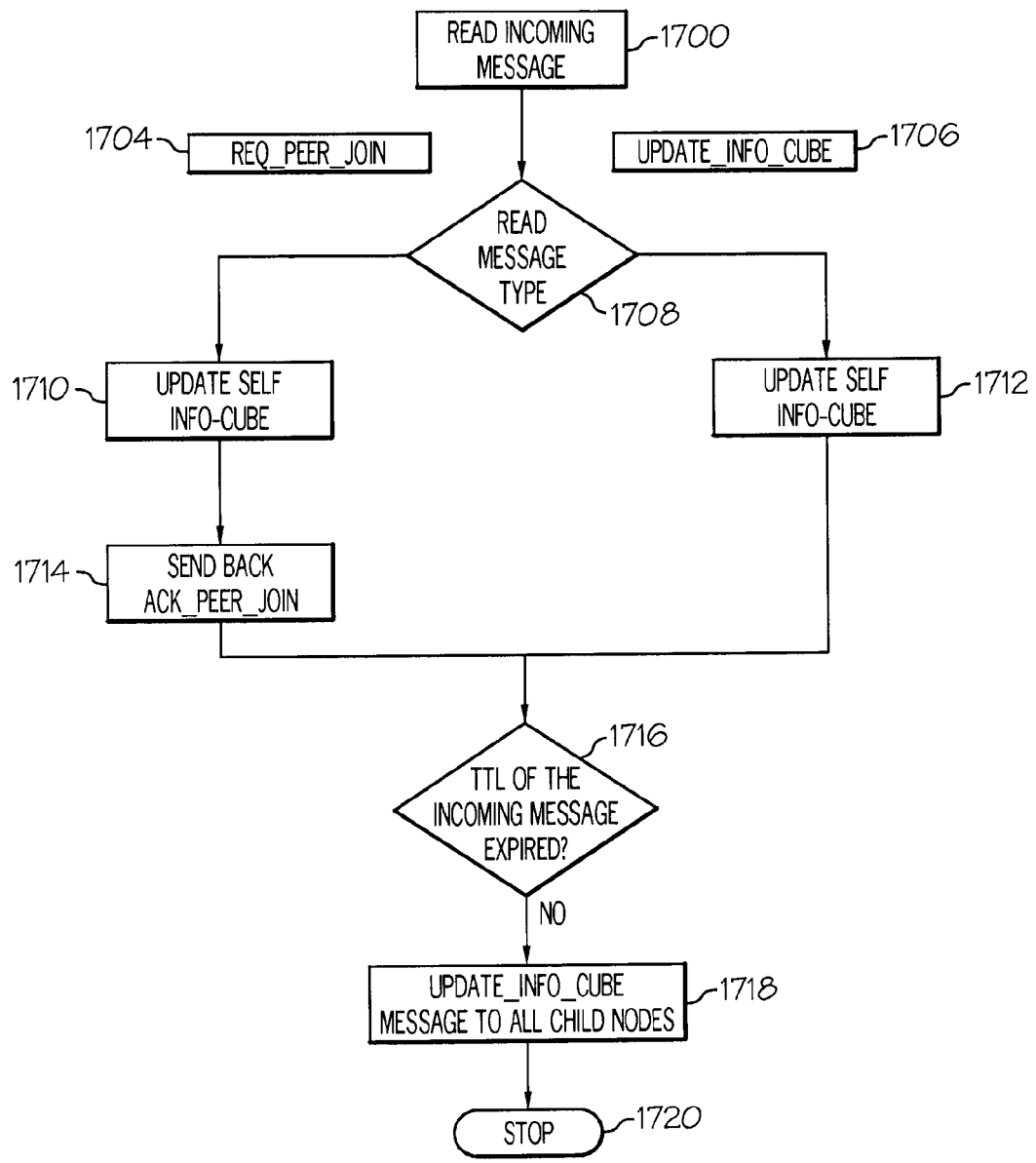
FIG. 16 shows the steps that take place for two different types of messages.

The Info-Cubes are updated on the arrival of two types of messages: REQ_PEER_JOIN and UPDATE_INFO_CUBE. FIG. 16 shows the steps that take place for these two different types of messages. At 1700 an incoming message is read. At block 1708, the message type is read as a REQ_PEER_JOIN 1704 or a UPDATE_INFO_CUBE 1706 message from one of its peers. The payload of the message contains the Info-Cube of the sender of the message. Both these messages result in the local metadata being updated. The node extracts the incoming Info-Cube as part of the payload and updates its own Info-Cube at block 1710 or block 1712, respectively, as indicated by:

$$I_{Existing} = I_{Existing} \cup I_{External}$$

Where ∪ is the 'Union' operator previously discussed above, $I_{Existing}$ is the local Info-Cube of the node, and $I_{External}$ is the Info-Cube in the received message.

If the message is of type REQ_PEER_JOIN 1704, in addition to updating the Info-Cube at block 1710, the node responds to the sender by sending an ACK_PEER_JOIN message at block 1714. Subsequent to block 1712 or block 1714, it is determined at decision block 1716 whether the incoming message has expired. If the response to decision block 1716 is no, the TTL parameter is decremented and an UPDATE_INFO_CUBE message is sent at block 1718 with the new TTL and its own copy of the Info-Cube to all the nodes connected thereto. If the response to decision block 1716 is yes, or subsequent to block 1718, the process stops at block 1720.

Figure 17:
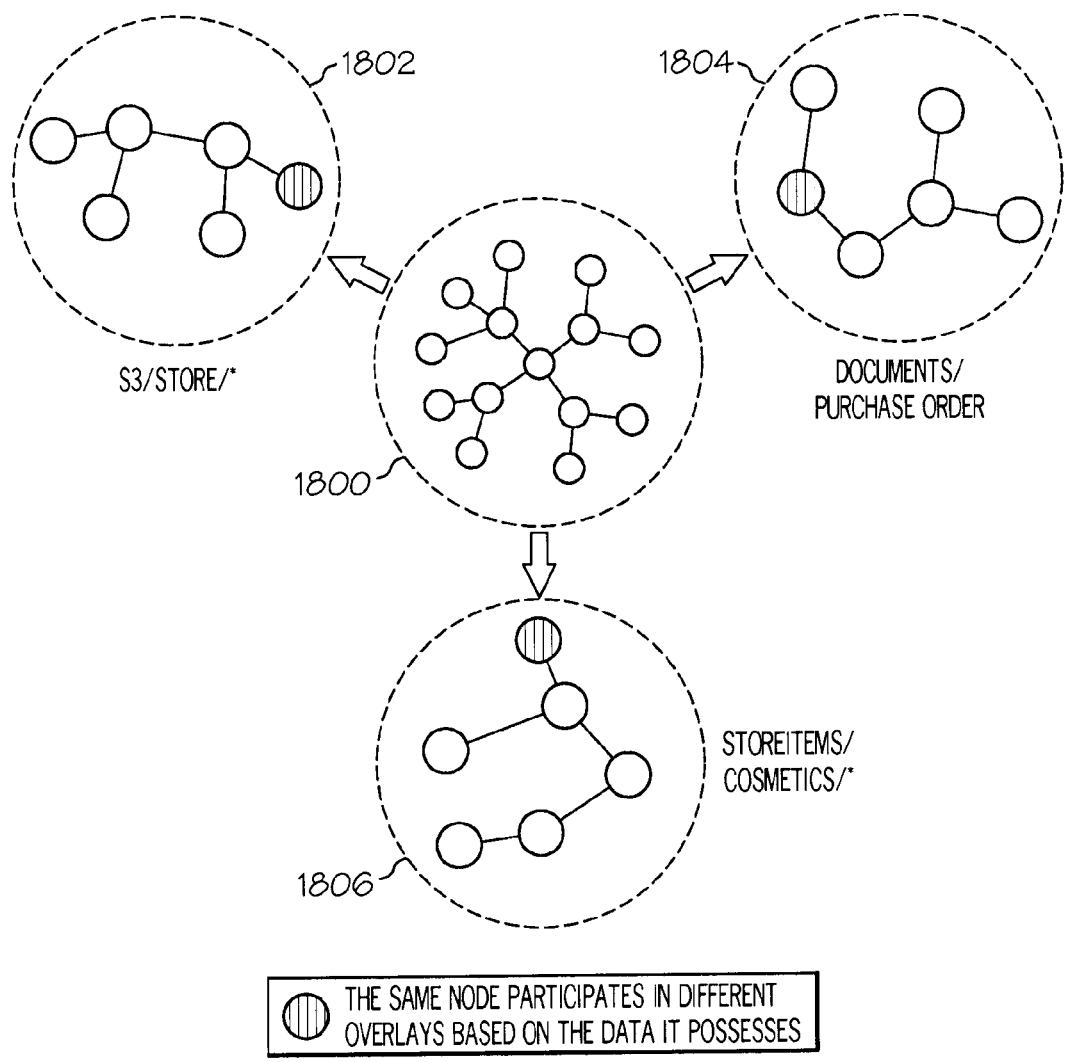
FIG. 17 illustrates how one node can be part of multiple overlays based on the data it possesses in its Info-Cube.

Once the network has reached stage 3 (Metadata aware network using Info-Cube propagation), there may be requests for a particular type of data residing in the network. Any such requests are translated and used to build an overlay by triggering search queries on the network which is now metadata aware. The overlay is in the form of a Spanning Tree, which contains the nodes that need to be part of the overlay for the specified query dimension. Multiple such overlays may be constructed. FIG. 17 illustrates a basic unplanned network 1800 transformed into three different overlays based on a query dimension projected on them. For example, Overlay 1802 may represent a S3/Store/* query dimension, overlay 1804 may represent a Documents/Purchase query dimension, and Overlay 1806 may represent a StoreItems/Cosmetics/* query dimension. FIG. 17 also illustrates how one node can be part of multiple overlays based on the data it possesses as embodied in its Info-Cube.

In an embodiment of the present invention an algorithm present in all the nodes is triggered when a query dimension is submitted to any node in the network. This algorithm allows nodes to know of the metadata present in other nodes. The data exchanged is in the form of minimal spanning trees constructed with the localized information available within the nodes. As time proceeds, all the nodes posses the information required to infer the global metadata information present in the network.

Global information present in the network is used by the nodes to infer the final network overlay. The overlay formation involves two different types of messages. The initial trigger message (REQ_DATA) is from the external world and is sent to any node in the network. The node that receives the initial trigger message (REQ_DATA) starts the process of overlay formation. The first rudimentary spanning tree is computed from its own local information and triggers a cascade of UPDATE_SPAN_TREE messages to all the peer nodes that will update the spanning tree and complete it.

Figure 18:
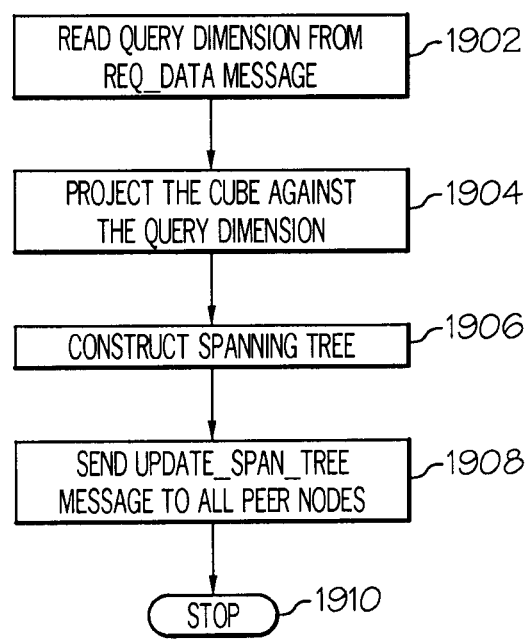
FIG. 18 illustrates the start of overlay formation.

As shown in FIG. 18, the overlay formation starts with a node receiving a REQ_DATA message which is read at block 1902. The receiving node, such as, Node X, projects the query dimension against the Info-Cube present and extracts all nodes that possess this metadata at block 1904. The receiving node triggers the overlay formation by constructing the first spanning tree at block 1906 with the information available to it. The node then triggers a cascade of UPDATE_SPAN_TREE messages to all of its peers at block 1908. Each peer node (a peer is the set of nodes to which any node is connected) adds to the spanning tree with its own local information so that the tree gradually grows to the overlay that is needed and stops at 1910.

Figure 19:
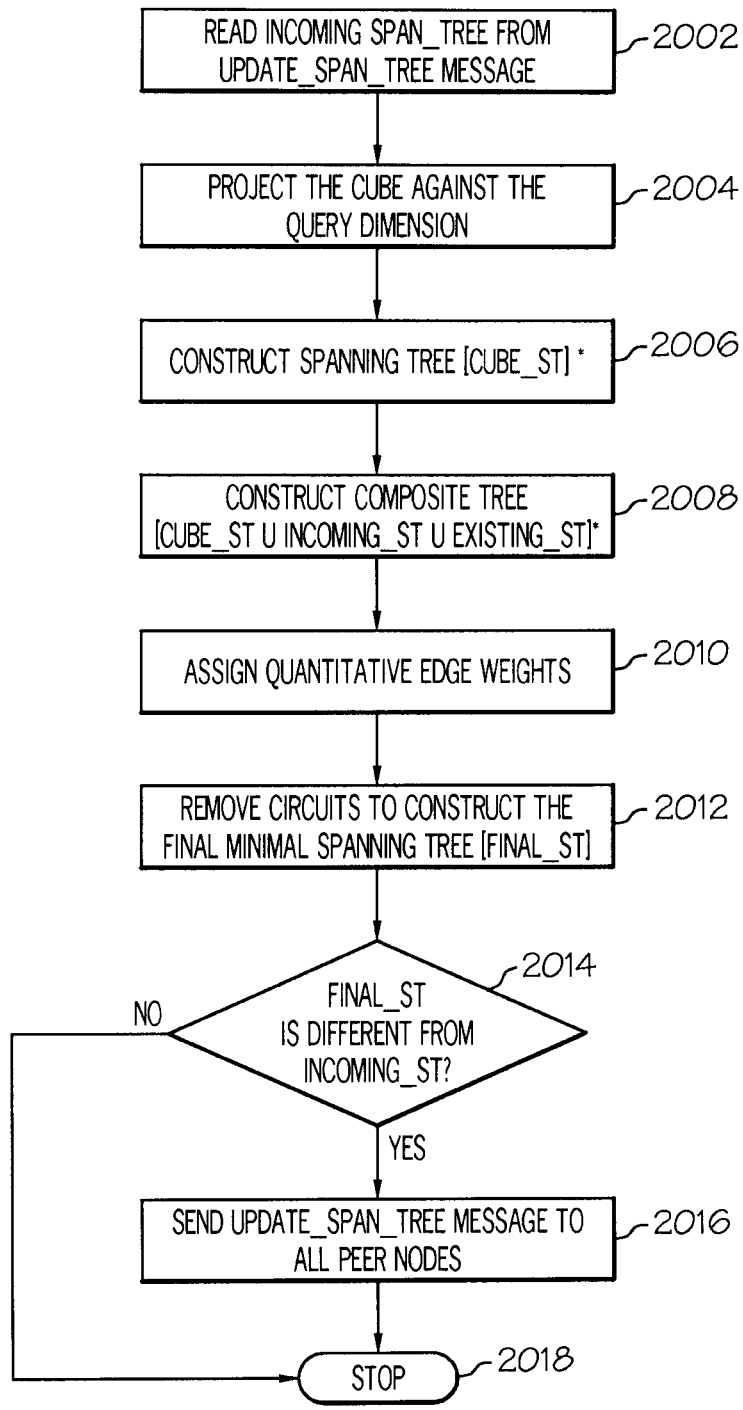
FIG. 19 illustrates the final overlay.

Referring to FIG. 19, the final overlay is arrived at by a cascade of UPDATE_SPAN_TREE messages at block 2002 that successively grow the spanning tree to form a complete overlay. At block 2004, the Info-Cube is projected against the query dimension (as previously discussed above). At block 2006, a spanning tree (Cube_ST) is constructed from the projection at block 2004. At block 2008, a composite tree is constructed by combining (∪) the Cube_ST and the Incoming_ST (a spanning tree arriving as a payload in the UPDATE_SPAN_TREE message at block 2002) with the spanning tree already stored in the node (Existing_ST).

Quantitative edge weights (the difference in the quantitative measures of the metadata element for which the overlay is being constructed) are assigned at block 2010. Circuits are removed, as previously discussed above, to construct the minimal spanning tree [Final_ST] at block 2012. At decision block 2014, it is determined whether the Final_ST is different from the Incoming_ST. If the response to decision block 2014 is no, the process ends at 2018. If the response to decision block 2014 is yes, the UPDATE_SPAN_TREE message is sent to all peer nodes at block 2016, and the process ends at 2018.

The various stages of the growing overlay, embodied in a spanning tree are provided in greater detail in FIG. 23. FIG. 23 describes the steps that a node (9.1.1.1) does to update its own copy of the overlay (in the form of a spanning tree) when it gets a piece of information about the overlay (in the form of a spanning tree) from one of its neighboring nodes. Initially, in the first row 2302, there is no overlay information (in the form of a spanning tree) with the node (here, called the Existing_ST 2304). In the second row 2306, when a request comes for S3/*/FR 2308, the node first projects its own info-cube against this query and gets a list of nodes that match (shown in the Tree Details column 2310). Using this data, the spanning tree (here, called the Cube_ST 2312) is constructed, as shown in the Tree column 2314. In the third row 2316, the node gets additional information about the overlay from its neighbor, the Incoming_ST 2318. In the fourth row 2320, the node will update its own overlay information (in the form of a spanning tree) by performing a union of the Existing_ST 2304, the Cube_ST 2312, and the Incoming_ST 2318.

Constructing the Minimal Spanning Tree

The final overlay built is a Minimal Spanning Tree of a sub-graph $G_S$ of a hypothetic fully connected graph $G_F$, ($V_f$, $E_f$). $V_f$ contains all the nodes present in the original unplanned graph. To further explain how the final overlay is built and to understand the algorithm, a hypothetical graph, $G_F$, is used.

Starting with the assumption that there is a fully connected graph $G_F$ ($V_f, E_f$) (where G is the graph, V is the set of vertices and E is the set of edges). The final overlay, as a spanning tree (which is also a graph), is a sub-graph of this fully connected graph. A sub-graph contains only some nodes and some edges of the original fully connected graph. Next, the nodes and edges to be selected from $G_F$ are indicated by the condition:

$G_S$ ($V_S, E_S$) is a subgraph of $G_F$, such that Condition 1 is satisfied:

If $v_1$ and $v_2$ are the vertices corresponding to any edge e, where e∈$E_s$, and H(n,d) is the Info-Cube, thus:

$$\forall e \exists i_1, i_2, i_1 (1 < n) \qquad \text{Condition 1:}$$

such that $$h(i_1, i_2, i_1) = \text{query dimension AND } (v_1, v_2) \in h(i_1, i_2 i_1)$$

$(v_1, v_2) \in h(i_1, i_2, i_1)$ means that the nodes $v_1, v_2$ appear as keys in the list stored in $h(i_1, i_2, i_1)$.

In other words, $G_s$ is constructed such that all edges in $E_s$ exist if and only if the corresponding vertices are connected along the query dimension of any Info-Cube present in the system.

∀e ∃$i_1$, $i_2$, $i_1$ (l<n)—(which reads as "for every edge 'e', there exists indices $i_1,i_2,i_1$ (l<n) such that" h($i_1,i_2,i_1$)=query dimension AND ($v_1,v_2$)∈h($i_1,i_2,i_1$)—(which reads as "the indices match the query dimension AND the vertices ($v_1,v_2$) corresponding to the edge belong to the hypercube."

The above condition indicates that in the spanning tree, the edge 'e' which joins vertices $v_1$ and $v_2$ will be retained in the sub-graph only if there are indices $i_1$, $i_2$, $i_1$ in the hypercube h, such that these indices correspond to the query dimension for which this overlay is being built (where query dimension means the index of the hypercube corresponding to the query, for example, the query dimension for S3/Airport/CustomsArea is H(0,1,2) and so on) AND nodes $v_1$, $v_2$ appear as keys in the list stored in the h($i_1,i_2,i_1$)—meaning that these 2 nodes have the metadata that is being requested.

For computing the minimal spanning tree, the basic premise is that the graph should be weighted. To satisfy this condition, Edge_Weights are assigned to the graph before the spanning tree is constructed. Edge Weights are the difference in the quantitative measures of the metadata element for which the overlay is being constructed. For example, referring again to FIG. 23 under the Tree Details column 2310 for the Overlay requested for S3/*/FR 2308:

Node 1 2322 has 250 units and Node 3 2324 has 750 units. Therefore, the edge 2326 connecting Node 1 and Node 3 has its Edge_Weight as 500 (750–250=500).

Circuits might result in the graph when the union of three trees is performed as shown in the fourth row 2320 of FIG. 23. The weights form the basis for removing edges from the graph. The edge with the highest weight is removed from the circuit so that nodes of comparable quantitative measure are connected together. In the fourth row 2320, when all three versions of the spanning trees are merged, the resulting graph has one circuit present (1,2,3). Studying this circuit, edge 2326 (1,3) has the highest weight (500). Therefore, this edge 2326 (shown as a dashed line) is removed, resulting in a minimal spanning tree with edges corresponding to (1,2) (2,3) (2,7) (2,6).

Figure 20:
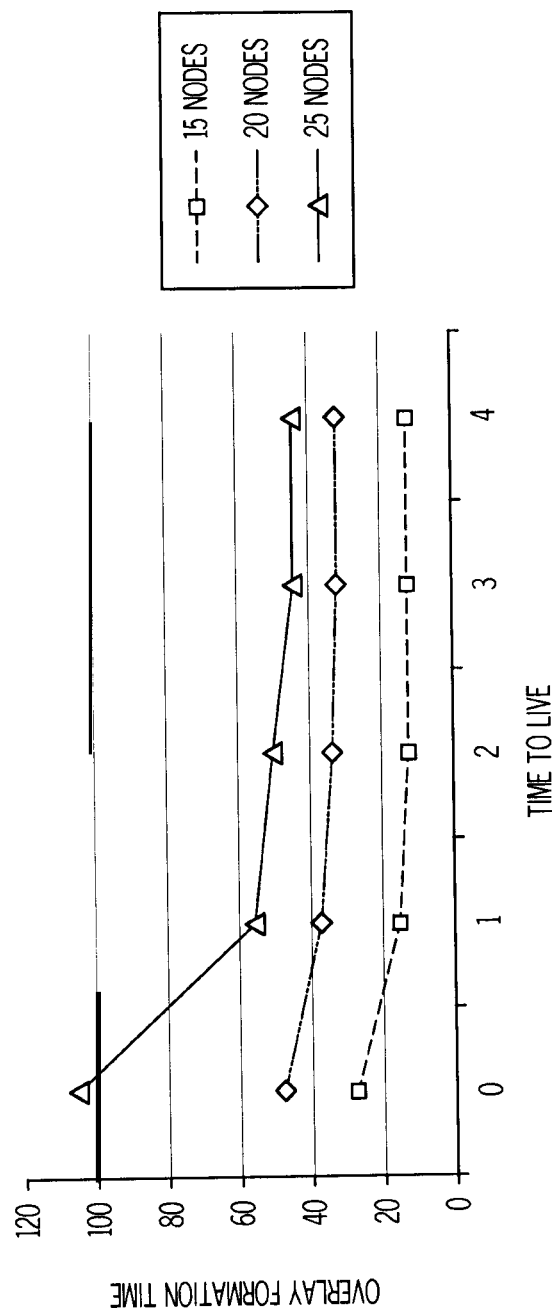
FIG. 20 shows the results of increasing TTL, and the impact it has on the time taken for overlay formation.

As previously discussed above, the larger the TTL for the UPDATE_INFO_CUBE messages, the less time it takes for the final overlay formation. FIG. 20 shows results of increasing TTL, and the impact it has on the time taken for overlay formation. The simulation is repeated for 3 different networks with various node sizes. The results of the simulations indicate that the time for the final overlay formation is cut by 50% when TTL=1 (propagating the UPDATE_INFO_CUBE messages once), as compared with TTL=0 (not propagating the UPDATE_INFO_CUBE messages at all). Thus, with a small increase in TTL, there is a significant impact in the time needed for the final overlay creation. Also, the larger the number of nodes, the greater is the impact of having the Info-Cubes propagate around the network for TTL greater than 1. Table 3 illustrates the quantitative values in FIG. 20:

TABLE 3

Overlay formation time for various TTL

| TTL | Time for Overlay Formation (seconds) | | |
| --- | --- | --- | --- |
|  | 15 nodes | 20 nodes | 25 nodes |
| 0 | 27 | 48 | 106 |
| 1 | 15 | 37 | 55 |
| 2 | 12 | 34 | 50 |
| 3 | 12 | 32 | 44 |
| 4 | 12 | 32 | 44 |

Figures 21A, 21B:
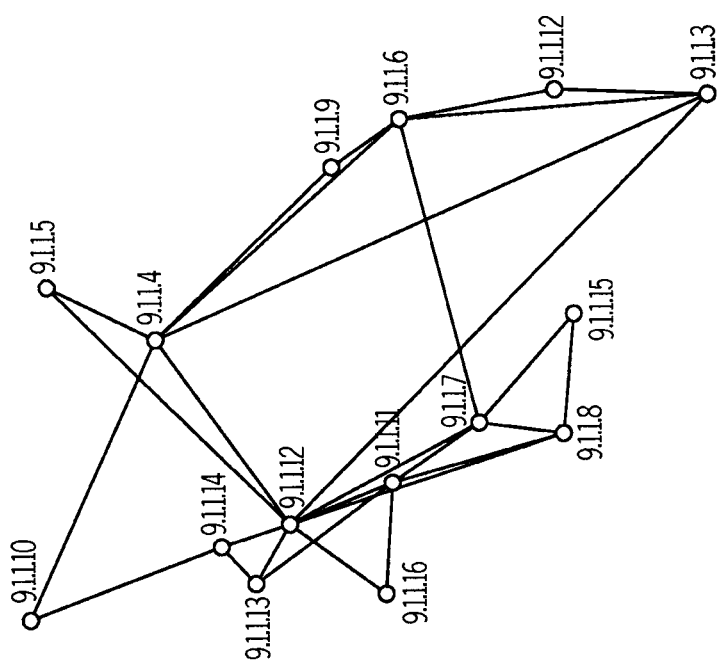
FIGS. 21A, 21B, 21C, and 21D illustrate a fifteen node system.
Figure 21D:
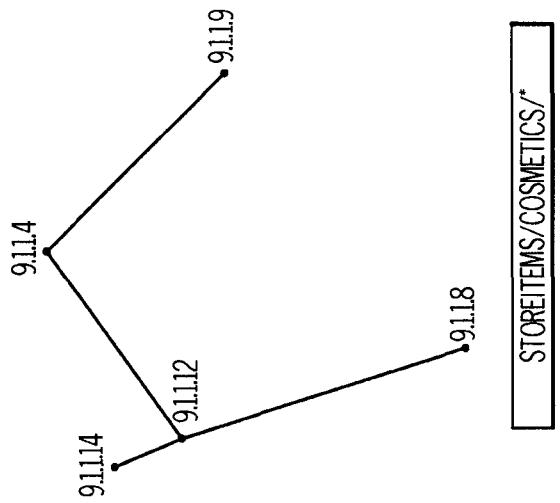
Figure 21C:
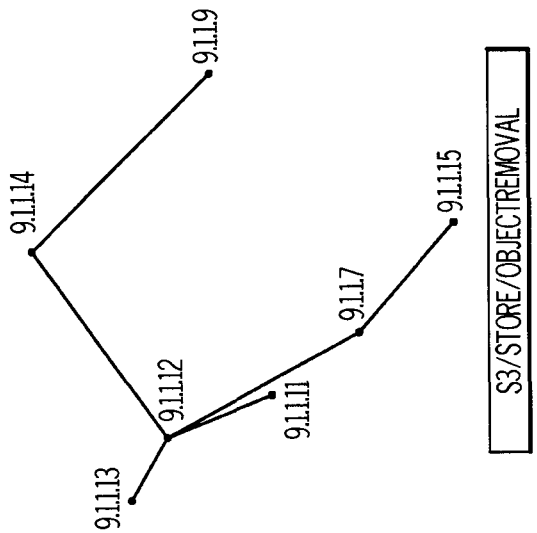

FIG. 21A shows a 15 node system with a random network configuration. The network has no special significance with regard to the content it hosts. However, when there is a request to look at all S3 content that has ObjectRemoval related videos, a query, 'S3/Store/ObjectRemoval' is created. FIG. 21B shows the actual nodes of the network that have content related to the incoming query. Thus, there needs to be an overlay network that connects all nodes having object removal videos. Once the query is presented to any node in the network, the node initiates overlay formation, and finally a new overlay network, as shown in FIG. 21C, results. This overlay network includes all the nodes that have object removal videos. Similarly, another request for all stores hosting cosmetics (query, such as StoreItems/Cosmetics/*) in the network results in another overlay as shown in FIG. 21D.

Figure 22B:
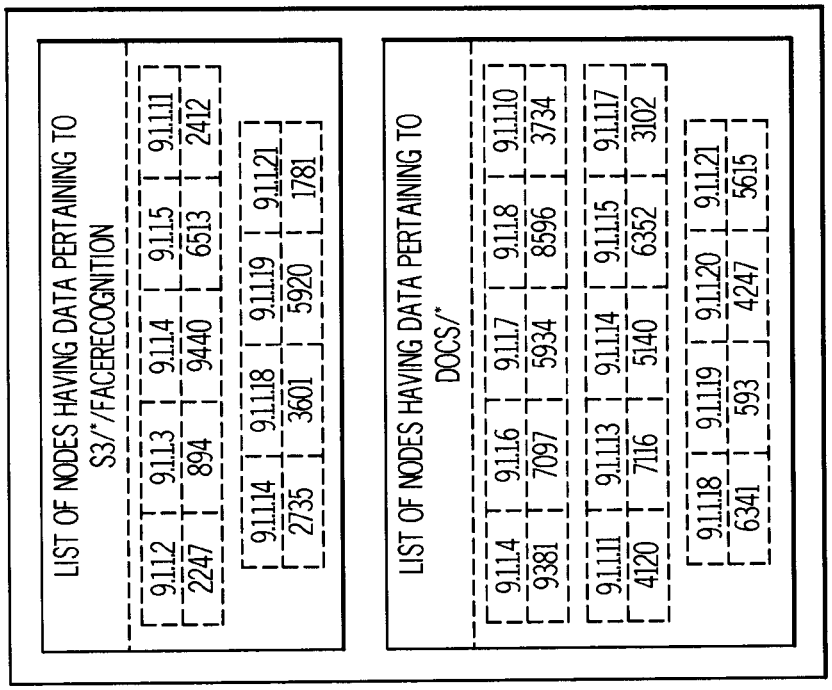
FIGS. 22A, 22B, 22C, and 22D illustrate a twenty node system having a metadata tree similar to the one shown in FIG. 2.
Figure 22A:
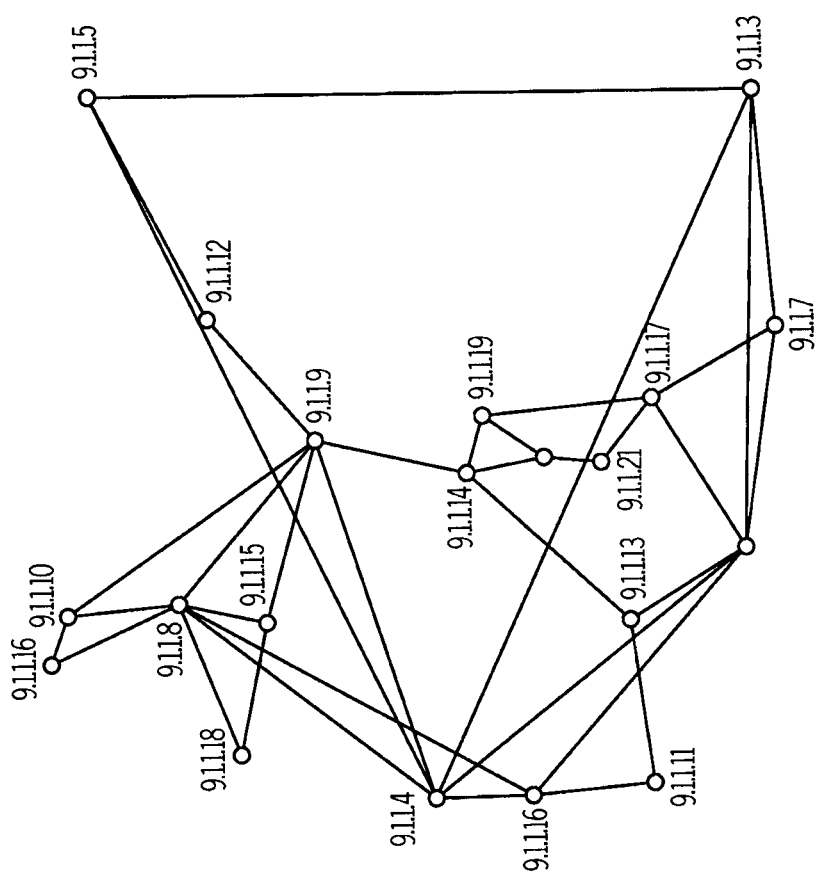
Figure 22D:
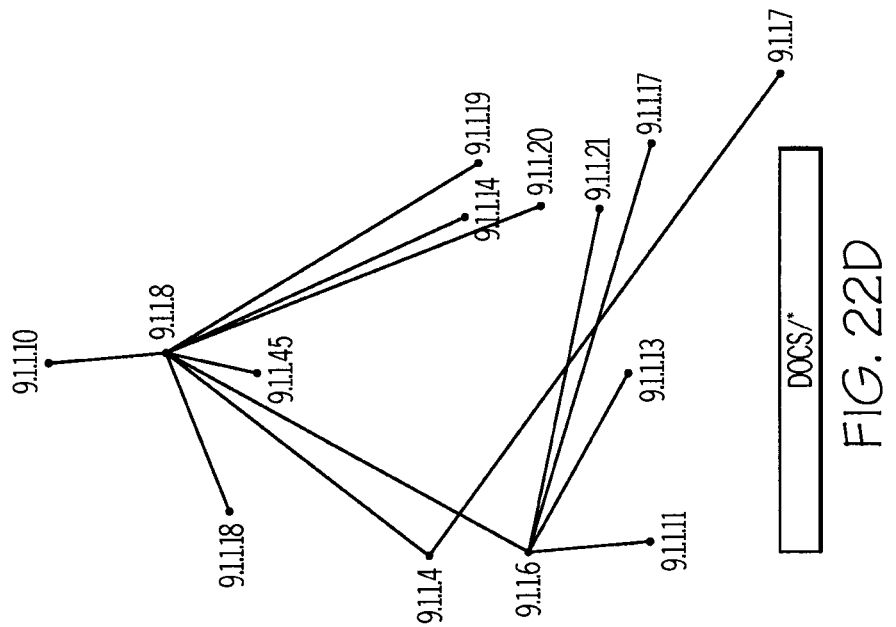
Figure 22C:
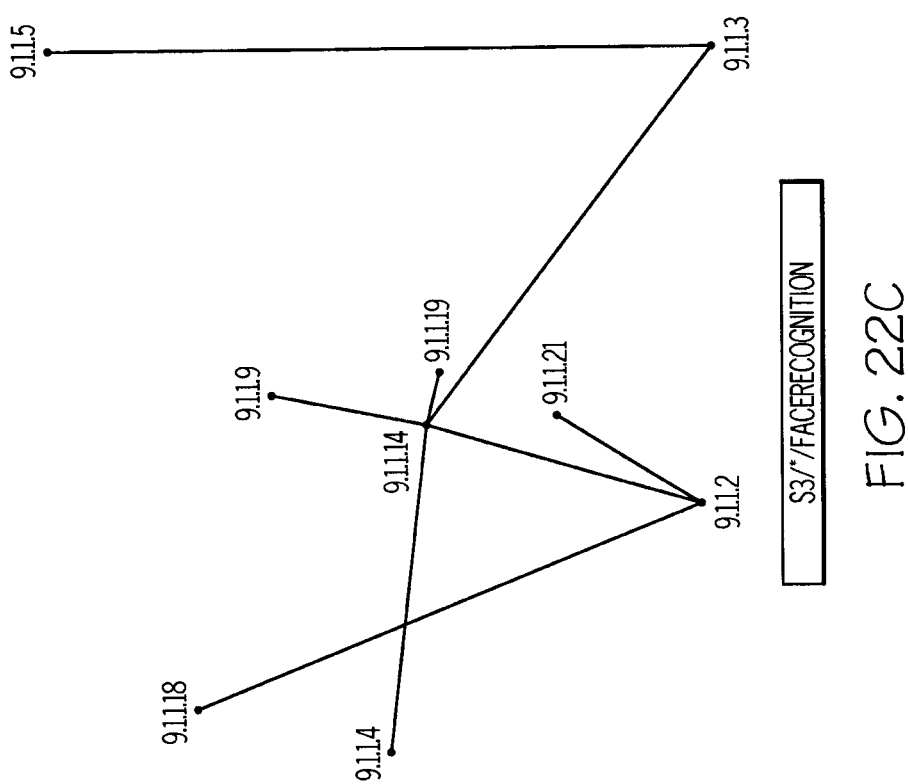

Similarly, FIG. 22A shows a 20 node system with a random network configuration. The network has no special significance with regard to the content it hosts. In this example, there is a request to find all S3 content that has FaceRecognition related videos. This translates to a query comprising 'S3/*/FaceRecognition.' FIG. 22B shows the actual nodes of the network that have content related to the incoming query. Thus, there needs to be an overlay network that connects all these nodes having face recognition videos. Once the query is presented to any node in the network, the node initiates an overlay formation and finally a new overlay network, as shown in FIG. 22C, results. This overlay network has all the nodes having FaceRecognition videos. Similarly another request for all documents for a query of 'Docs/*' in the network results in another overlay as shown in FIG. 22D.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of dynamically building an overlay of a computer network, comprising:

converting, with a processor, a data classification hierarchy, representing data stored in each of a plurality of computing nodes, into a hypercube for each of said computing nodes using a metadata transformation function, each said hypercube having dimensions corresponding to data in said classification hierarchy and each of said dimensions represented by metadata descriptions of said stored data, wherein each cell of each said hypercube has a least possible hamming distance between any related cells;

using said processor and a union operation to exchange information about said metadata between any neighboring hypercubes to form merged hypercubes; and upon receipt of a search request comprising a set of dimensions to be queried at one of said computing nodes in the computer network, initiating, with said processor, metadata discovery using a series of dimension reducing projections against each said hypercube and said merged hypercubes until required dimensions are obtained, wherein said required dimensions are connected to form the overlay, said overlay comprising a virtual network over the computer network.

2. The method of claim 1, wherein the overlay comprises a spanning tree.

3. The method of claim 2, further comprising adding quantitative values to edges of said spanning tree.

4. The method of claim 3, further comprising removing circuits from said spanning tree by removing edges with a largest quantitative value.

5. The method of claim 1, further comprising using a bootstrap server to obtain information about which computing nodes in said computer network to connect.

6. The method of claim 1, further comprising using a time-to-live parameter to determine a depth of hypercube propagation across said network.

7. The method of claim 6, further comprising checking for expiration of said time-to-live parameter, and if expired, sending an update message to all computing nodes in said overlay.

8. A computer system for dynamically building an overlay of a computer network, comprising a processor programmed to:
    convert a data classification hierarchy, representing data stored in each of a plurality of computing nodes, into a hypercube for each of said computing nodes using a metadata transformation function, each said hypercube having dimensions corresponding to data in said classification hierarchy and each of said dimensions represented by metadata descriptions of said stored data, wherein each cell of each said hypercube has a least possible hamming distance between any related cells;
    use a union operation to exchange information about said metadata between any neighboring hypercubes to form merged hypercubes; and
    upon receipt of a search request comprising a set of dimensions to be queried at one of said computing nodes in the computer network, initiate metadata discovery using a series of dimension reducing projections against each said hypercube and said merged hypercubes until required dimensions are obtained, wherein said required dimensions are connected to form the overlay, said overlay comprising a virtual network over the computer network.

9. The computer system of claim 8, wherein the overlay comprises a spanning tree.

10. The computer system of claim 9, further comprising adding quantitative values to edges of said spanning tree.

11. The computer system of claim 10, further comprising removing circuits from said spanning tree by removing edges with a largest quantitative value.

12. The computer system of claim 8, further comprising using a bootstrap server to obtain information about which computing nodes in said computer network to connect.

13. The computer system of claim 8, further comprising using a projection to expand said overlay.

14. The computer system of claim 8, further comprising using a time-to-live parameter to determine depth of hypercube propagation across said network.

15. The computer system of claim 14, further comprising checking for expiration of the time-to-live parameter, and if expired, sending an update message to all computing nodes in said overlay.

16. A computer program product for dynamically building an overlay of a computer network, the computer program product comprising a computer readable storage medium having computer readable program code embodied therewith, comprising:
    computer readable program code configured to convert a data classification hierarchy, representing data stored in each of a plurality of computing nodes, into a hypercube for each of said computing nodes using a metadata transformation function, each said hypercube having dimensions corresponding to data in said classification hierarchy and each of said dimensions represented by metadata descriptions of said stored data, wherein each cell of each said hypercube has a least possible hamming distance between any related cells;
    computer readable program code configured to use a union operation to exchange information about said metadata between any neighboring hypercubes to form merged hypercubes; and
    upon receipt of a search request comprising a set of dimensions to be queried at one of said computing nodes in the computer network, computer readable program code configured to initiate metadata discovery using a series of dimension reducing projections against each said hypercube and said merged hypercubes until required dimensions are obtained, wherein said required dimensions are connected to form the overlay, said overlay comprising a virtual network over the computer network.

17. The computer program product of claim 16, wherein the overlay further comprises computer readable program code configured to form a spanning tree.

18. The computer program product of claim 17, further comprising computer readable program code configured to add quantitative values to edges of said spanning tree.

19. The computer program product of claim 18, further comprising computer readable program code configured to remove circuits from said spanning tree by removing edges with a largest quantitative value.

20. The computer program product of claim 16, further comprising computer readable program code configured to use a bootstrap server to obtain information about which computing nodes in the computer network to connect.

21. The computer program product of claim 16, further comprising computer readable program code configured to use a time-to-live parameter to determine depth of hypercube propagation across said network.

* * * * *